(12) United States Patent
Ling et al.

(10) Patent No.: US 8,782,112 B2
(45) Date of Patent: Jul. 15, 2014

(54) METHODS AND SYSTEMS FOR OPTIMAL ZERO-FORCING AND MMSE FREQUENCY DOMAIN EQUALIZERS FOR COMPLEX AND VSB SIGNALS

(75) Inventors: Fuyun Ling, San Diego, CA (US); Wanlun Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 13/171,300

(22) Filed: Jun. 28, 2011

(65) Prior Publication Data

US 2013/0003817 A1 Jan. 3, 2013

(51) Int. Cl.
*G06F 17/10* (2006.01)

(52) U.S. Cl.
USPC .......................................... 708/323

(58) Field of Classification Search
None
See application file for complete search history.

(56) References Cited

U.S. PATENT DOCUMENTS

| | | | |
|---|---|---|---|
| 4,594,607 A | 6/1986 | Lewis, Jr. et al. | |
| 7,027,500 B1* | 4/2006 | Casas et al. | 375/232 |
| 7,483,480 B2 | 1/2009 | Guo et al. | |
| 7,697,615 B2 | 4/2010 | Ungerboeck | |
| 7,729,434 B2 | 6/2010 | Arslan et al. | |
| 7,773,700 B2 | 8/2010 | Kang et al. | |
| 7,792,184 B2 | 9/2010 | Smee et al. | |
| 2003/0007554 A1* | 1/2003 | Birru | 375/233 |
| 2004/0021795 A1 | 2/2004 | Kim | |
| 2007/0104282 A1 | 5/2007 | Vihriala | |
| 2007/0237244 A1 | 10/2007 | Huang et al. | |
| 2013/0003817 A1* | 1/2013 | Ling et al. | 375/232 |

FOREIGN PATENT DOCUMENTS

| | | |
|---|---|---|
| WO | 0147260 A1 | 6/2001 |
| WO | WO2004098138 A1 | 11/2004 |
| WO | 2006088685 A2 | 8/2006 |
| WO | 2009028857 A2 | 3/2009 |

OTHER PUBLICATIONS

International Search Report and Written Opinion—PCT/US2012/043680—ISA/EPO—Oct. 11, 2012.
Wang X., et al., "Design and Implementation of Frequency Domain Equalizer for ATSC System", Broadband Multimedia Systems and Broadcasting, 2008 IEEE International Symposium on, Mar. 31, 2008, pp. 1-6, XP031268564.
Li, et al., "A Novel Fractionally Spaced Frequency Domain Equalization Scheme for Single Carrier Cyclic Prefix Assisted MIMO-CDMA Systems," IEEE 65th Vehicular Technology Conference, 2007. VTC2007-Spring, Apr. 22-252, 2007, p. 1510-1514, ISSN: 1550-2252, ISBN: 1-4244-0266-2, Current Version: May 29, 2007.

(Continued)

*Primary Examiner* — David H Malzahn

(57) ABSTRACT

An improved receiver apparatus and algorithm for equalizing signals in a receiver device may equalize a block of data generated from N data symbols in a single carrier communication system. A first algorithm may be applied to a plurality of signal samples to generate a frequency domain representation of the samples. A channel estimate may be generated and a frequency response of a zero-forcing or a minimum-mean-square equalizer is applied. A conjugate of the computed frequency response is multiplied with a frequency domain representation for each sample to generate a product value. N-aliased frequency domain values from the generated product value may be determined for each of the samples. A second algorithm is applied to the generated N-aliased frequency domain values to generate estimates of the transmitted time domain data symbols.

127 Claims, 16 Drawing Sheets

(56) References Cited

OTHER PUBLICATIONS

Sicard, et al., "Introduction to GSM," Sep. 20, 2001, eetimes.com, 7 pgs.

Turletti, A brief Overview of the GSM Radio Interface, MIT Technical Memorandum, TM-547, Mar. 1996, 10 pages.

"GSM Edge Cellular Evolution Technology," Radio-Electronics.com, Adrio Communications Ltd., Apr. 14, 2011.

* cited by examiner

METHODS AND SYSTEMS FOR OPTIMAL ZERO-FORCING AND MMSE FREQUENCY DOMAIN EQUALIZERS FOR COMPLEX AND VSB SIGNALS

BACKGROUND

In wireless communications, information is typically communicated in symbols that are encoded onto a radio frequency (RF) signal by a modulation scheme that receiver devices can detect and decode to recover the data symbols from received RF signals. In a conventional single carrier system, the transmitted signals containing the information or data to be sent are usually represented as complex modulation symbols using phase shift keying (PSK) or quadrature amplitude modulation (QAM). Vestigial sideband modulation (VSB) is another modulation method which attempts to eliminate the spectral redundancy of pulse amplitude modulated (PAM) signals. Modulating a real data sequence by a cosine carrier results in a symmetric double-sided pass band spectrum. The symmetry implies that one of the sidebands is redundant, and removing one sideband with an ideal brick wall filter should preserve the ability for perfect demodulation.

In both cases, the signals are modulated on a carrier for transmission over a communication channel before they are received by a receiver at the other end of the channel. The main objective of data reception is to recover the transmitted data as perfectly as possible. Recovery of the encoded information is often limited by the amount of distortion and noise introduced in the received signal resulting from a variety of sources and phenomenon within the transmission path, which is referred to generally as the "channel." Thus, improvements in signal reception may be accomplished by reducing or eliminating the distortions and improving the filtering of the transmitted signal from the noise in the communication channel.

SUMMARY

The various embodiment systems, circuits and methods provide an improved receiver apparatus and acquisition algorithm improved methods for recognizing encoded symbols in the presence of noise and channel distortion. The various embodiments provide a computationally efficient hardware structure to minimize the hardware complexity and reduce the computational time. The various embodiments include receiver devices and methods operable within a processor of a receiver device that receives RF signals, and generates a channel estimate in a time domain. The channel estimate is used to compute a frequency response of a minimum mean square equalizer. The processor may generate domain values from the product values and may generate estimates of the transmitted time domain data symbols, which may be translated into corresponding data bits for processing.

In a first embodiment, a method and a computing device having a processor configured with executable instructions to perform the method, includes equalizing a block of signal data generated from N data symbols in a single carrier communication system, performing a pN point discrete Fourier transform of samples at a p/T sampler output, and generating the frequency domain representation of r(kT/p). It also generates a channel estimate and its frequency domain representation. The processor may compute the frequency response of a zero-forcing or minimum-mean-square equalizer. The processor may multiply a conjugate of the computed frequency response with a frequency domain representation for each sample to generate a product value. The processor may generate N-aliased frequency domain values from the generated product value for each of the samples in a transition band and perform an N point inverse discrete Fourier transform on the generated N-aliased frequency domain values to generate estimates of a transmitted time domain data symbol.

In a second embodiment, a method and a computing device having a processor configured with executable instructions to perform the method, includes equalizing a block of signal data generated from N data symbols in a single carrier communication system, receiving a plurality of samples, apply a first algorithm to the samples to generate a frequency domain representation of the samples, generating a channel estimate based on the samples and the frequency domain representation of the channel, computing a frequency response of a zero-forcing or minimum-mean-square equalizer, multiplying a conjugate of the computed frequency response of the channel with a frequency domain representation for each sample to generate a product value, determining N-aliased frequency domain values from the generated product value for each of the samples in a transition band, and applying a second algorithm to the generated N-aliased frequency domain values to generate estimates of a transmitted time domain data symbol.

In a third embodiment, a method and a computing device having a processor configured with executable instructions to perform the method, includes receiving signal samples, applying a first algorithm to the samples to generate a frequency domain representation of the samples, generating a channel estimate based on the samples and the frequency domain representation of the channel, computing the frequency response of an equalizer, multiplying a conjugate of the computed frequency response of the channel with a frequency domain representation for each sample to generate a product value, generating N-aliased frequency domain values, and applying a second algorithm to the generated N-aliased frequency domain values to generate estimates of a transmitted time domain data symbol.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
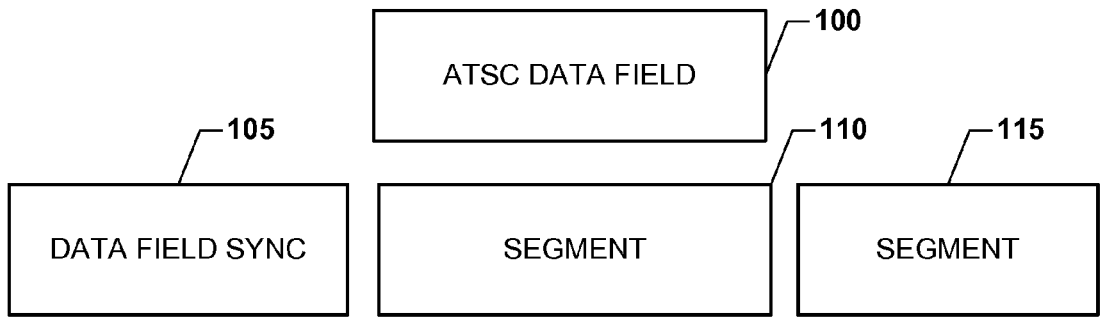
FIG. 1 is an illustration of an ATSC Data Field.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "receiver device" and "receiver" refer to any one or all of wireless communication receivers configured to receive wireless communication signals transmitted in using encoding and modulation. Such receiver devices may include mobile multimedia broadcast receivers, cellular telephones, and similar personal electronic devices which include receiver circuitry capable of demodulating symbols, and a programmable processor and memory.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The various embodiments may be implemented in a receiver device configured to receive wireless transmissions. An example of wireless transmissions suitable for use with the embodiments is ATSC-M/H (Advanced Television Systems Committee-Mobile/Handheld) standard for mobile digital televisions and that allows broadcasts to be received by mobile devices. ATSC-M/H is an extension to the available digital TV broadcasting standard ATSC A/53. ATSC is optimized for a fixed reception in the typical North American environment and uses 8VSB modulation. The ATSC transmission scheme can be designed for highly directional fixed antennas. The ATSC transmission scheme may have additional channel coding mechanisms are introduced in ATSC-M/H to protect the signal. ATSC-M/H technology and 8VSB modulation are only one example of a communication protocol that may benefit from the embodiments, and the embodiments may also be used with other digital communication and broadcast technologies and modulation. Therefore, references ATSC-M/H technology and 8VSB modulation are not intended to limit the scope of the claims unless specifically recited in claim elements.

A-VSB or Advanced VSB is a modification of the 8VSB modulation system used for transmission of digital television using the ATSC system. Prior art ATSC transmission includes a drawback that reliable reception is difficult or impossible when the receiver is moving at speeds associated with normal vehicular traffic. A-VSB builds on the existing ATSC transmission standard and enhances a digital television receivers' ability to receive the main MPEG transport stream in a dynamic environment. A-VSB provides for multiple streams with forward error correction and time diversity encoding for enhanced reception by a receiver. A-VSB also provides for synchronization of multiple transmission towers.

A-VSB may include a supplementary reference signal, a scalable turbo stream (STS), and support for single frequency networks (SFN). A-VSB receivers utilize SRS in order to remain synchronized with the transmission. SRS maintains reception of the main stream and any turbo streams even with rapidly changing multipath interference. The SRS adds an additional equalizer training sequence to the Transport Stream Adaptation Field. The added signal shortens the existing 24 ms equalizer update time by a selectable factor. A receiver equipped with this new equalizer can track rapid multipath fading, and thus supports mobile reception.

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves a broadcast communication channel. The word "broadcast" is used herein to refer to the transmission of data (information packets) so that it can be received by a large number of receiving devices simultaneously. Examples of broadcast messages are mobile television service broadcast signals, including content broadcasts (content flow) and overhead information broadcasts (overhead flow) such as metadata messages.

FIG. 1 shows a conceptual block diagram illustrating an exemplary ATSC data field 100. The data field 100 includes segments 105, 110 and 115. Each segment 105, 110 and 115 represents digital information related to the ATSC data field 100. The first segment 105 is called a Data Field Synch. Other segments are illustrated in FIG. 2A.

Figure 2A:
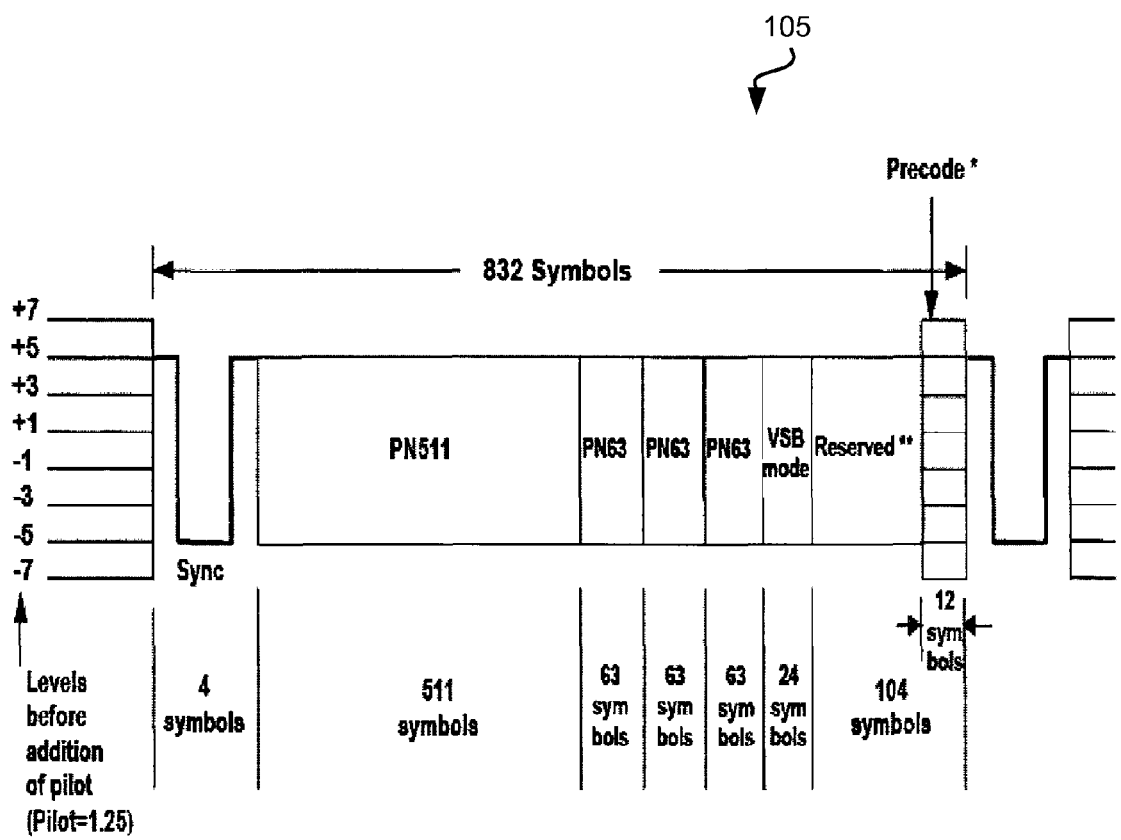
FIG. 2A is an illustration of a data field of FIG. 1 including symbols.

FIG. 2A is a timing diagram illustrating an exemplary ATSC Field Sych 105. The Data Field Synch 105 includes a PN511 synch pattern and three copies of a PN63 synch pattern. The middle pattern PN63 synch pattern can be inverted every other Data Field Synch 105. The Data Field Synch also includes 4 symbols for synch, 24 symbols for a VSB mode, and 104 symbols for a reserved portion of the Data Field synch 204 and a precode portion. In total, the Data Field Synch includes 832 symbols and the ATSC Data field contains 260,416 symbols or 313 segments multiplied by 832 symbols per segment.

Figure 2B:
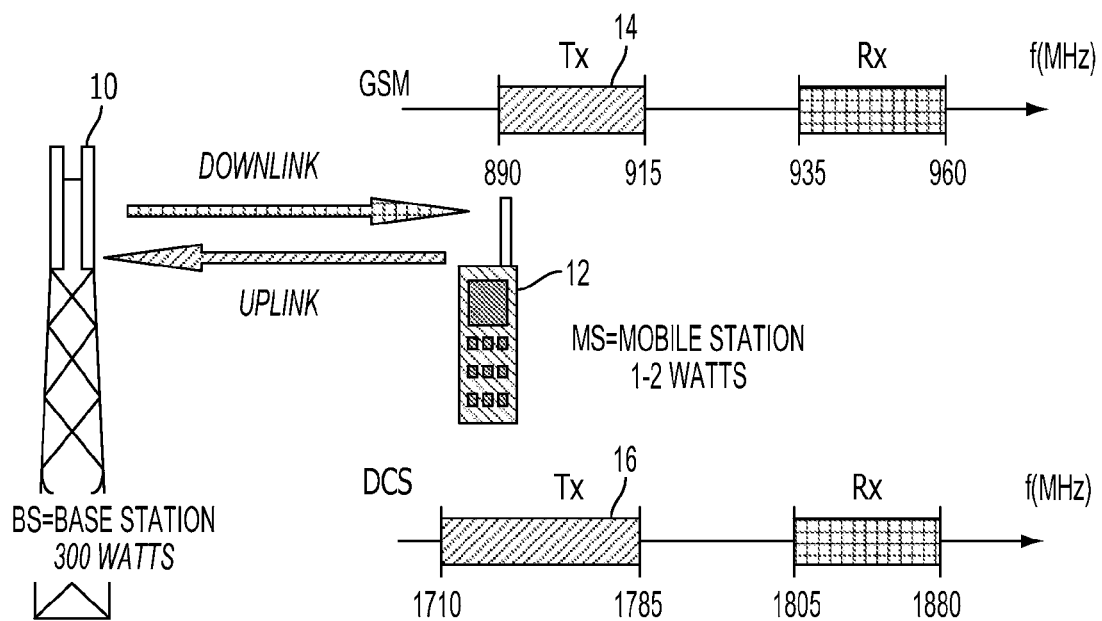
FIG. 2B illustrates a base station communicating with a mobile communication device.

FIG. 2B illustrates an example of a base station 10 communicating with a mobile phone 12 (also referred to as a mobile communication device 12) illustrating a single carrier system. The present method and system described herein may be used in CDMA, CDMA 2000, WCDMA, GSM, or any other single carrier system, or any communication system using frequency domain equalization known in the art. The various embodiments involve in the modulation and demodulation associated with communication systems. The figure illustrates an example communication system useful for explaining the various embodiments, including a GSM standard 14 and Digital Cellular Service 16 on the uplink and downlink with a transmitter operating at 890 to 915 MHz and a receiver operating at 935 to 960 MHz For the Digital Cellular Service 16, the transmitter may operate at a 1710 MHz frequency and at 1805-1880 MHz and the receiver may operate in a different frequency on the receiver side. The maximum GSM emission power from the mobile communication device 12 is 2 W in 900 MHz and 1 W in 1800 MHz. The base station may reach 300 W or less. FIG. 2B describes the frequency allocation for up and down links. A significant separation of the $T_x$ and Rx sub-bands may reduce interference and any potential coupling between the mobile communication device 10 transmitter and receiver components.

Figure 2C:
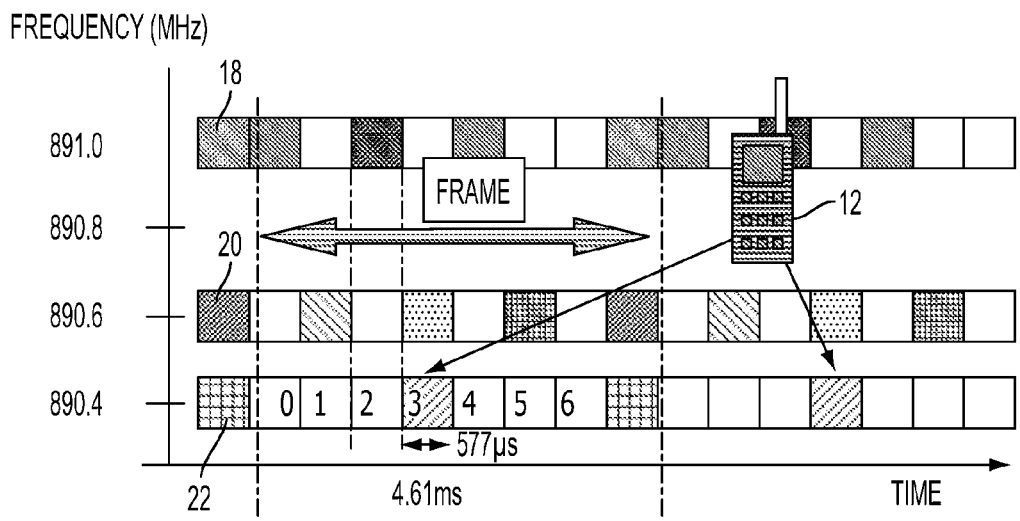
FIG. 2C illustrates a high level representation of a number of GSM frequencies.

FIG. 2C illustrates time domain multiple access (TDMA) which is a multiplexing approach to enable multiple devices to share a single frequency channel. TDMA is a channel access method for shared medium networks. TDMA permits users to share the same frequency channel by dividing the signal into different time slots. The users transmit in rapid succession, one after the other, each using a predetermined time slot as shown in FIG. 2C. Over a frame of 4.61 ms, each communication device 12 transmits information in a burst of 577 μs on the channel. The first through third frames are shown at different frequency channels 18, 20 and 22. Data may be multiplexed within the channels. Multiple communication devices 12 may share the same transmission medium (e.g. radio frequency channel) while using a part of a full channel capacity. TDMA is used in the digital 2G cellular systems such as Global System for Mobile Communications (GSM), IS-136, Personal Digital Cellular (PDC) and iDEN, and in the Digital Enhanced Cordless Telecommunications (DECT) standard for portable phones. TDMA may also be used in satellite systems, combat-net radio systems, and PON networks for upstream traffic from premises to the operator.

Figure 2D:
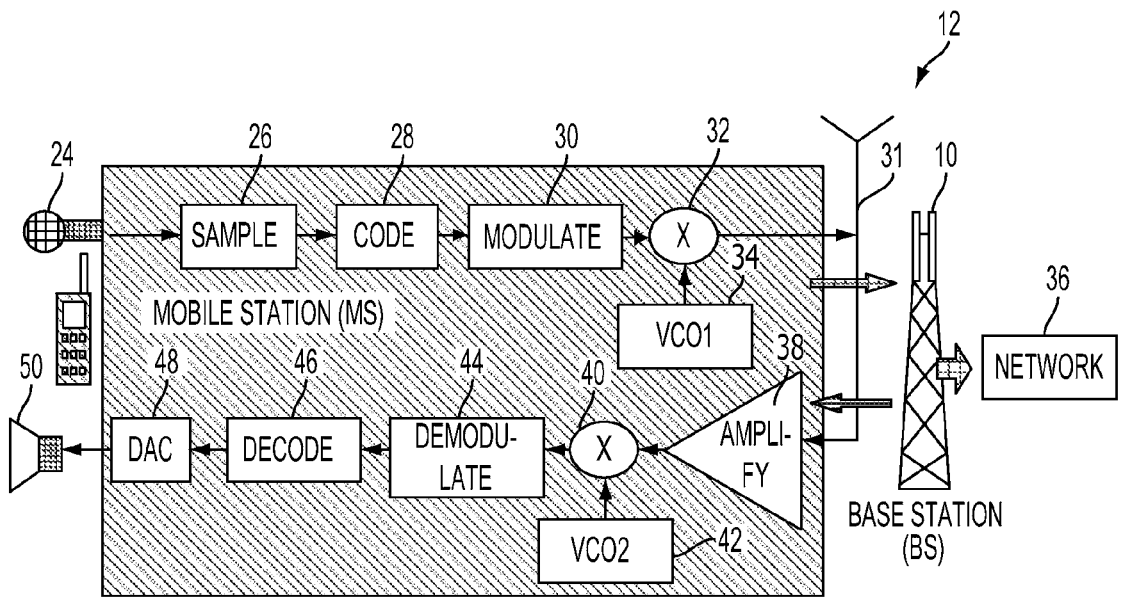
FIG. 2D is a component block diagram of a mobile communication device.

FIG. 2D illustrates a simplified high level block diagram of a mobile communication device 12. The mobile communication device 12 comprises a microphone 24 that is operatively connected to a sample component 26 and which is connected to an encoder block 28. The encoder block 28 is operatively connected to provide the encoded signal to a modulation block 30. A high-frequency oscillator 34 and 32 translates the modulated signal to a valid transmission frequency, which is provided to the antenna 31 to a base station 10 and to a network 36. The received signal (less than 1 mV) is amplified by an amplifier block 38 before down-conversion by an oscillator 40 and 42. The down converted signal is provided to a demodulator circuit 44 and to a decoder circuit 46 which is connected to a digital to analog converter 48. The low-frequency, demodulated, and decoded signal is provided to a speaker 50 for sound reconstruction.

Figure 2E:
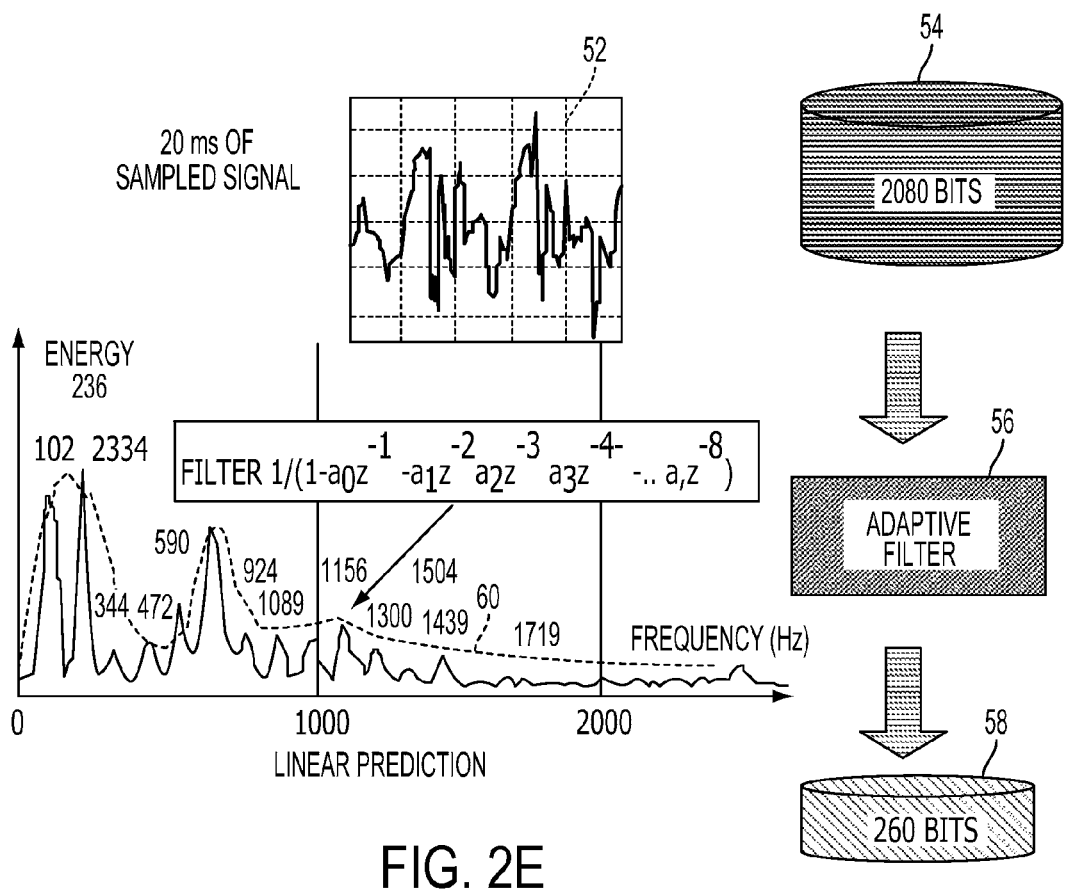
FIG. 2E illustrates a high level representation of GSM adaptive filtering.

FIG. 2E illustrates an adaptive filter on 20 ms of sampled data 52. For example, 2080 bits of data 54 may pass through the adaptive filter 56 and be reduced to 260 bits of data as shown by block 58. The voice encoder 28 contained in the GSM mobile communication device 10 splits the sound into portions of 20 ms, with a time-domain aspect being captured. The encoder 28 removes the redundant periodic structure of the sound (80% of the speech). Linear prediction and root mean square minimization can be used to compute coefficients to approximate each portion of sound by an adaptive filter 56 as shown by reference numeral 60. The filter coefficients are transmitted and not the sampled sound to reduce an amount of transmitted data. Low-order coefficients may be coded in a 6-bit format while high-order coefficients may be coded in a 3-bit format.

Figure 2F:
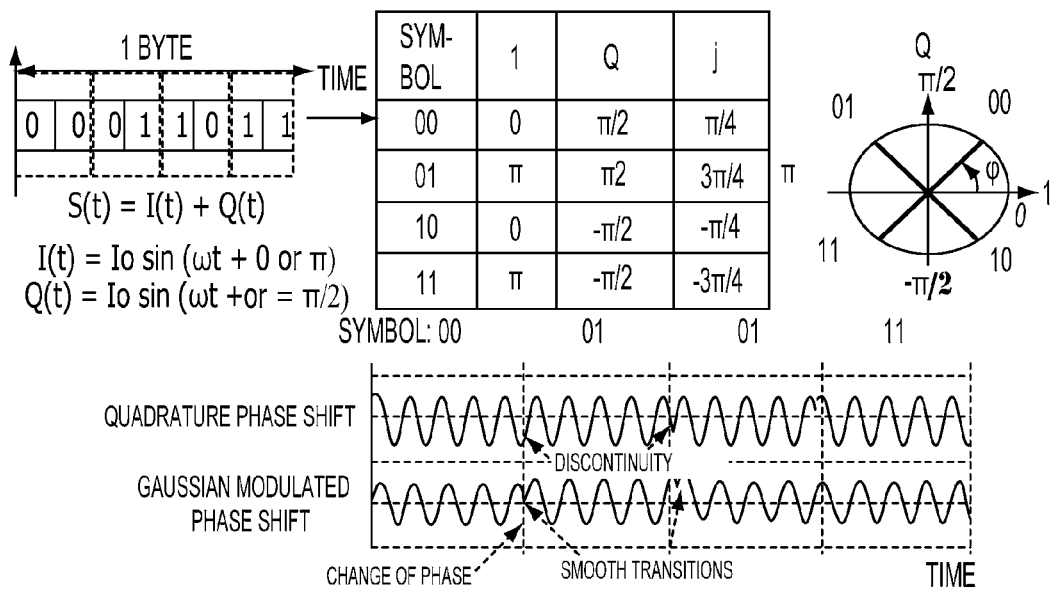
FIG. 2F illustrates a high level representation of GSM phase shift.
Figure 2G:
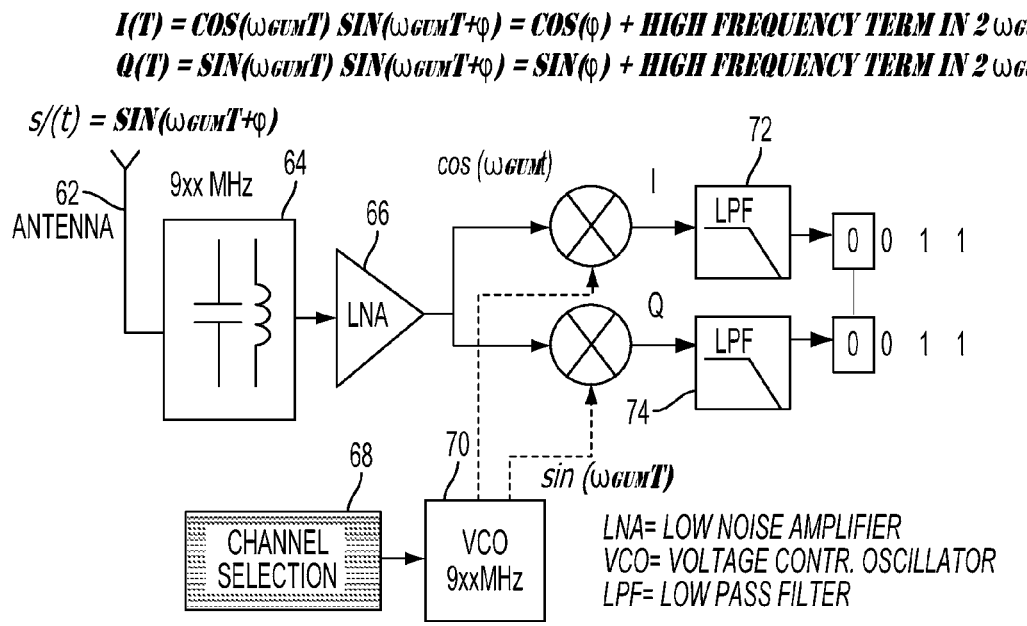
FIG. 2G is a component block diagram of an example receiver device including a GSM antenna connected to an amplifier, channel selection block, oscillators and low pass filters.

FIG. 2F illustrates a modulation scheme used in GSM that is derived from quadrature phase shift keying. Each byte of data is split into four pairs of bits. Bits correspond to a particular phase of the signal I(t) and Q(t). The modulated signal is the sum of the two sinusoidal waves, with a phase shift depending on the logic symbol. Smooth transitions in the Gaussian Modulated shift prevent the spread of harmonics in the emission spectrum. FIG. 2G shows a channel selection block 68 connected to a voltage oscillator 70 that is connected to first and second low pass filters 72 and 74. An antenna 62 is connected to a 9 MHz circuit 64, which is connected to a low noise amplifier 66. Amplifier amplifies the signal from the antenna 62, which is connected to the oscillator 70.

Figure 2H:
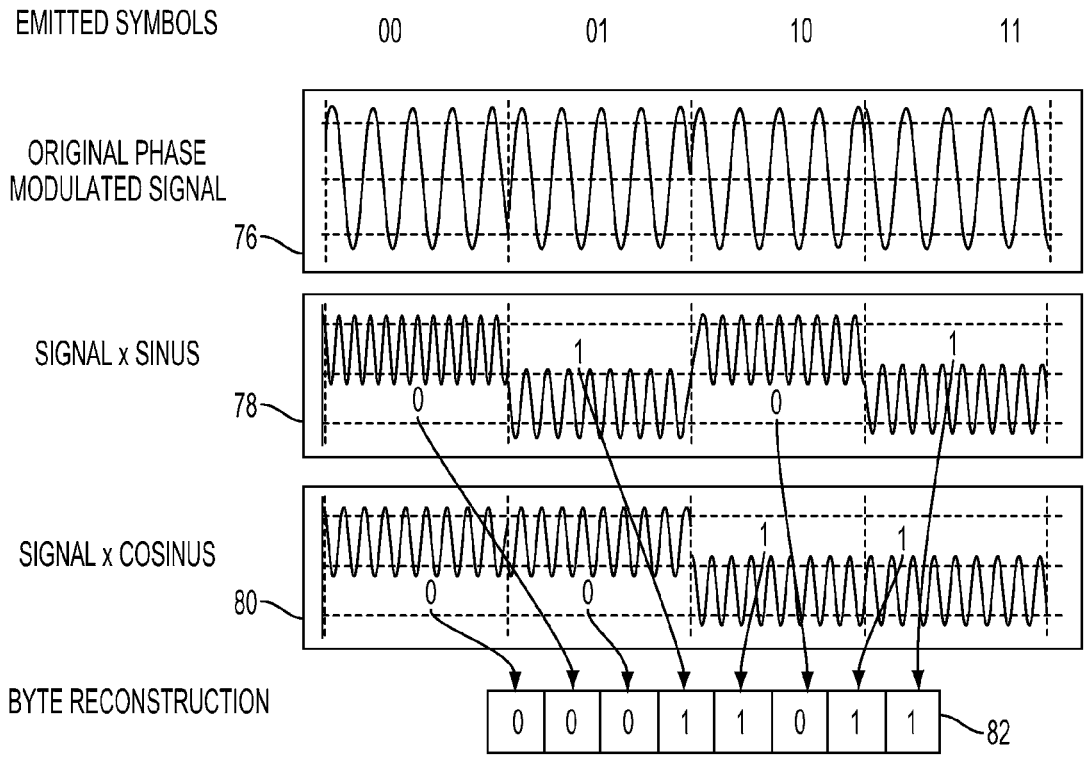
FIG. 2H illustrates a high level representation of a GSM byte reconstruction of an original phase modulated signal.

FIG. 2H illustrates numerical demodulation of phase modulated-signals based on the multiplication of the received signal by a sine and cosine with the same frequency 76. The result shown is a composition of two effects, a sinusoidal wave with twice the initial frequency (removed by filtering) and a voltage that correspond to the initial bits sent by the transmitter. Half the bits are obtained from multiplication by the cosine as shown by signal 78, while the other half from multiplication by the sine as shown by signal 80. At the price of bit manipulation, the bytes 82 are easily reconstructed.

Figure 3A:
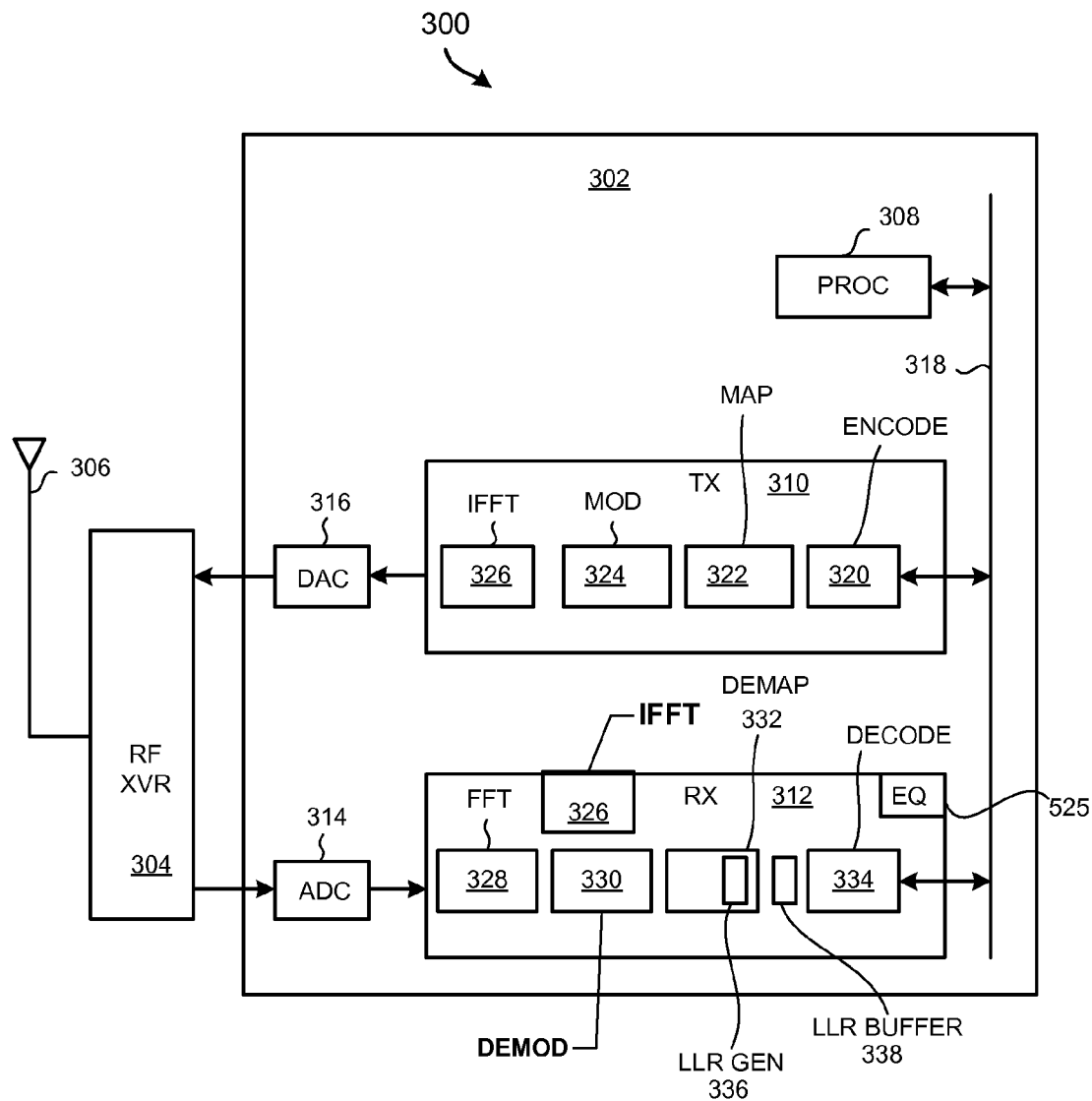
FIG. 3A is a simplified high level component block diagram of a mobile communication device.
Figure 3B:
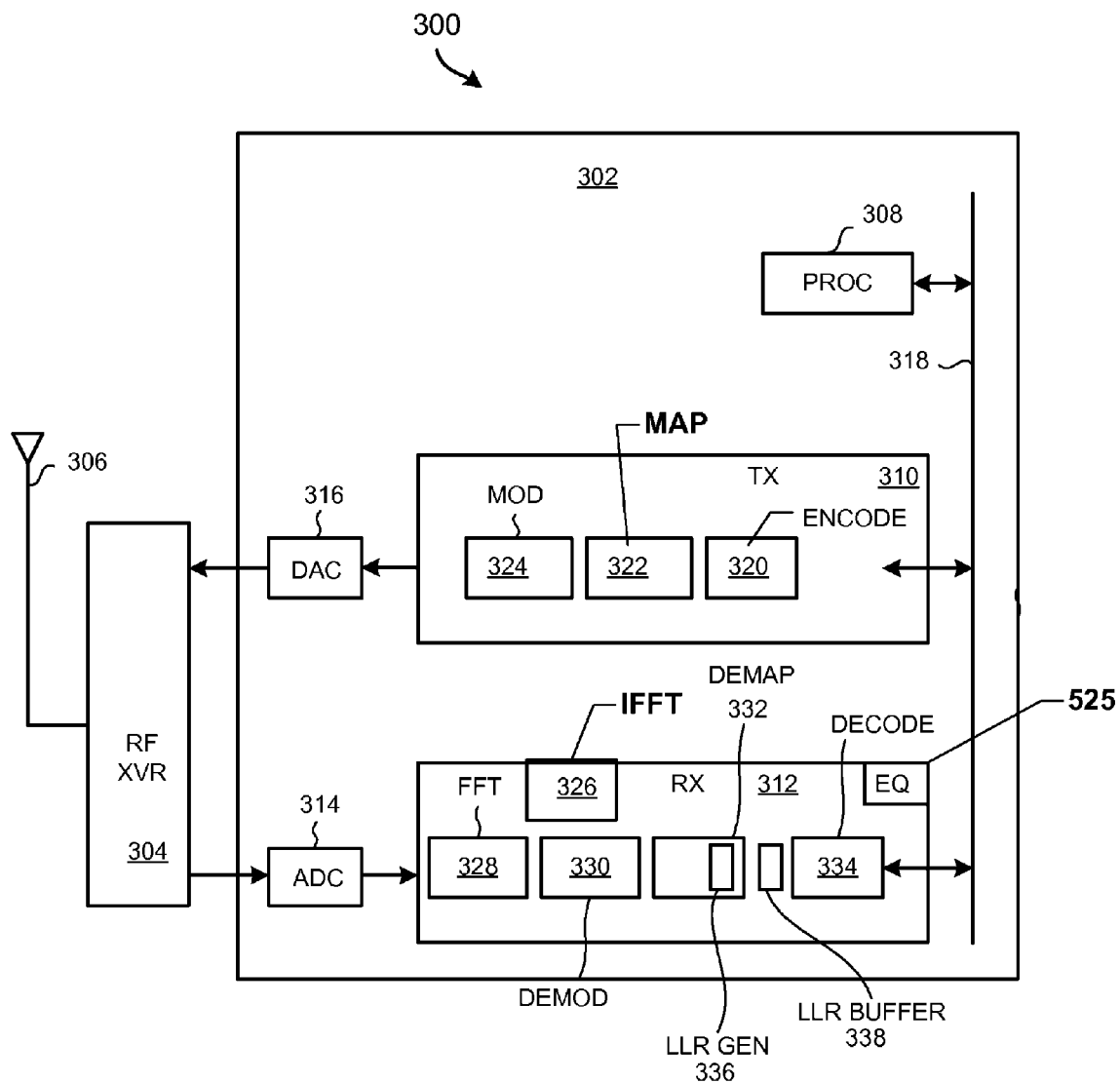
FIG. 3B is a simplified high level component block diagram of another embodiment of a mobile communication device.

FIG. 3A illustrates a simplified high level block diagram of a mobile communication device 300 including coding and decoding elements. The mobile device 300 may, for example, be a cellular telephone or a computing device. The mobile device 300 may include a digital baseband integrated circuit 302, a radio-frequency (RF) transceiver integrated circuit (RF XVR) 304, and an antenna 306. The digital baseband integrated circuit 302 may include a processing circuit 308, a transmit chain (TX) 310, a receiver chain (RX) 312, an Analog-to-Digital Converter (ADC) 314, a Digital-to-Analog Converter (DAC) 316, and a bus 318. The transmit chain 310 may include an encoder circuit (ENCODE) 320, a map circuit (MAP) 322, a modulator circuit (MOD) 324, and an optional Inverse Fast Fourier Transform circuit (IFFT) 326. In an aspect, the Inverse Fast Fourier Transform circuit IFFT block 326 may be omitted from the transmitter 310 based on a modulation characteristic of the device 300 as shown in FIG. 3B. For example, in various types of transmission systems the Inverse Fast Fourier Transform circuit IFFT block 326 may be present, or may be omitted from the transmitter 310, or may be integrated within a modulator circuit MOD block 324. Various modulation circuits are possible and modulation schemas and are within the scope of the present disclosure. The receiver chain 312 may include a Fast Fourier Transform circuit (FFT) 328, a demodulator circuit (DEMOD) 330, a demap circuit (DEMAP) 332, IFFT block 326 and a decoder circuit (DECODE) 334. The DEMAP 332 may include several sub-circuits including an LLR generator 336. An LLR buffer 338 may store the generated LLR values.

In a very simplified operational example, data may be communicated to mobile device 300 from a wireless broadcast system, such as a transmitter in an ATSC network. The wireless broadcast system may include a transmit channel. The data may be encoded by passing through similar ENCODE, MAP, MOD, elements and optional IFFT element and converted into analog form by a DAC for transmission or broadcast as an RF signal. The antenna 306 of a mobile device 300 may receive the encoded RF signal. The signal may be downconverted in frequency by a radio frequency transceiver (RF XVR) 304 and may be converted into digital form by an analog-to-digital converter (ADC) 314. The digital information may pass through a receiver (RX) chain 312 through a Fast Fourier Transform (FFT) circuit 328, a demodulator (DEMOD) 330, a de-mapping module (DEMAP) 332, and a decode module (DECODE 334). The resulting digital information passes via a bus 318 to a processing circuit 308.

Figure 4:
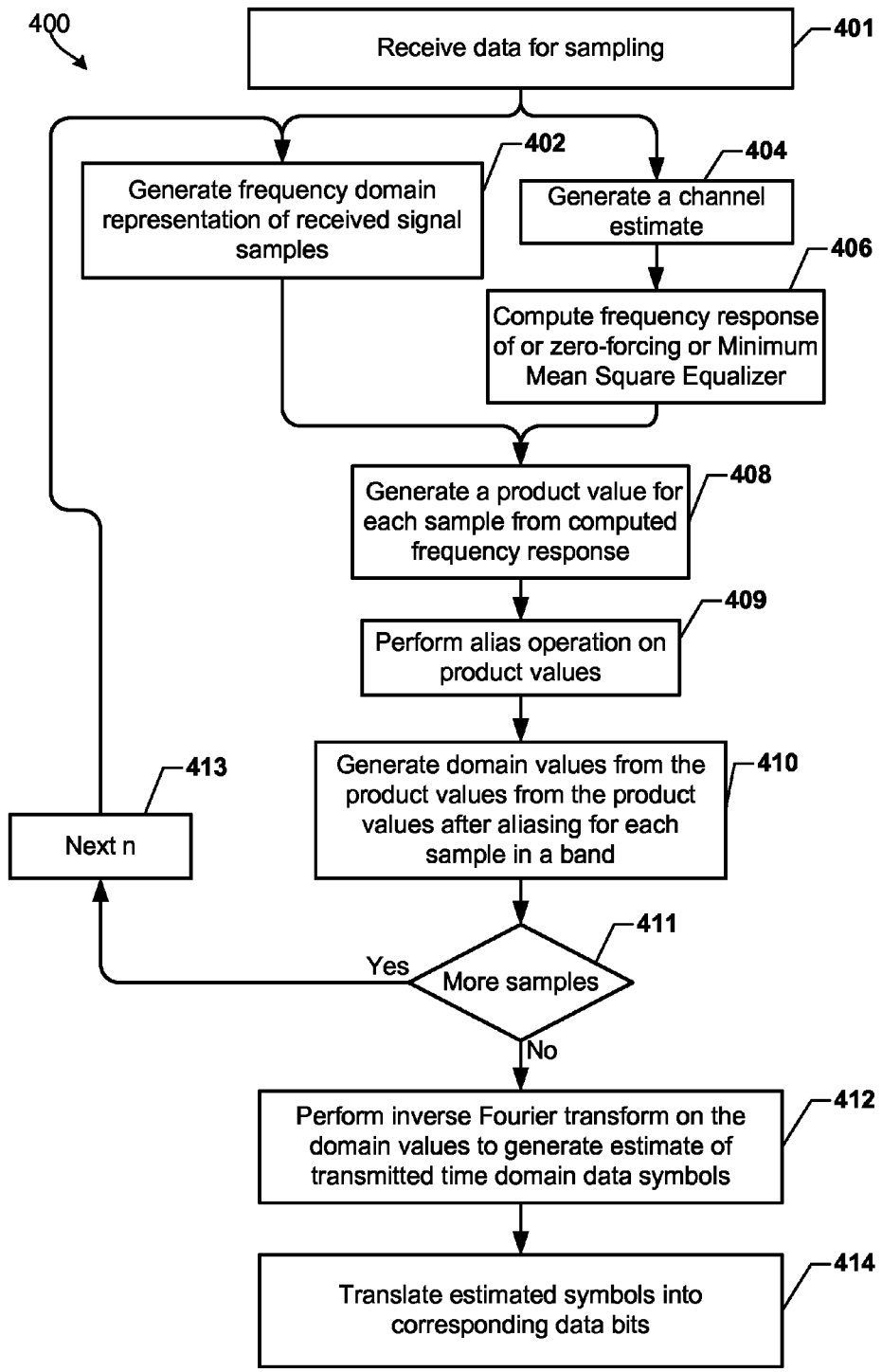
FIG. 4 is a process flow diagram of an embodiment method for receiving data symbols from a wireless transmission.

FIG. 4 illustrates an embodiment method 400 for receiving and recognizing symbols transmitted via a wireless channel using optimized linear equalizers. This method 400 may be implemented on a computing device that includes a processor configured with processor-executable instructions to perform the method operations. The optimized linear equalizer can be a zero-forcing equalizer that applies the inverse of the channel estimate to the received signal in order to restore the signal to the transmitted form before the noise and distortion due to transmission through the channel (e.g., multipath channels, inter-channel interference and channel distortions).

The optimized linear equalizer may be of the type useful for IEEE 802.11n multiple-input multiple-output (MIMO) where knowing the channel allows recovery of the two or more streams. In that case, the two or more streams will be received on top of each other on each antenna. A pilot signal burst is located in the GSM data with data streams on both sides of the pilot signal. The channel is selected by correlating the signal received to the pilot signal symbols that are known to recognize the pilot symbols. Since the pilot symbols were transmitted at known times and with known signal characteristics, received pilot symbols provide a reference for generating the channel estimate. The channel estimate can then be used to determine interference, transmission delays, multipath signal spreading, Doppler frequency shifts, etc. This information can be used by the optimized linear equalizer to bring down inter-symbol interference (ISI) to zero in a noise free environment. The optimized linear equalizer may be useful when inter-symbol interference due to channel distortion is significant compared to noise. For a channel with frequency response F(f) the zero forcing equalizer C(f) is constructed by C(f)=1/F(f). A combination of channel and equalizer gives a flat frequency response and linear phase, i.e., F(f)C(f)=1. Generally, the various embodiments provide the advantage that while the channel impulse response has finite length, the impulse response of the equalizer is sufficiently long to provide improved results. Further, the method 400 implemented on a processor performs operations on a frequency response to remove non-zero data so that data can be inverted using an inverse Fast Fourier Transform (IFFT), but the method 400 is not limited to this Inverse Fast Fourier Transform algorithm as different modulation schema may be used in the various embodiments.

The optimized linear equalizers may be used in single carrier communication systems. Specifically, the method 400 involves single-carrier frequency-domain equalization of a band limited channel response in the presence of multipath interference. In wireless receivers, equalizers reduce time-delay spreads that cause inter-symbol interference in the presence of multipath channels, inter-channel interference and channel distortions. A zero forcing equalizer inverts the frequency response of the channel. This is accomplished by applying the inverse of the channel to the received signal.

However, zero forcing equalizers ignore additive noise and do not operate well for certain channel types. Minimum-mean-square equalizers minimize the mean-square error. This error is minimized between the output of the equalizer and the transmitted symbol. This may be accomplished by balancing a ratio between the added noise and the amount of allowable inter-symbol interference.

A Zero Forcing Equalizer refers to a form of linear equalization algorithm used in communication systems which inverts the frequency response of the channel. The Zero-Forcing Equalizer applies the inverse of the channel to the received signal, to restore the signal to the condition before the distortions that occurred during transmission via the channel. For a channel with a frequency response F(f) the zero forcing equalizer C(f) is constructed by C(f)=1/F(f). Thus the combination of the channel and the equalizer gives a flat frequency response and linear phase, i.e., F(f)C(f)=1.

In reality, zero-forcing equalization does not work well, or not work at all, in most applications, for the following reasons. Even though the channel impulse response has finite length, the impulse response of the equalizer needs to be infinitely long. The channel may have zeroes in its frequency response that cannot be inverted. At some frequencies, the equalizer is not practical and may deteriorate the overall signal-to-noise ratio. The embodiments, including embodiment method 400 overcomes these problems.

Method 400 provides an optimized linear equalizer that is able to achieve ideal or near ideal channels in the presence of added noise. In method 400 in block 401, a processor implementing the method receives a block of data generated from N data symbols. Block 401 only receives a number of time-domain samples that may in one embodiment may be even or odd time domain samples as discussed herein. As part of block 401 a sample size may be selected, and the selection of the sample size may include adding a safety margin. The frequency domain representation of the samples is generated in block 402 and a channel estimate is generated in block 404. The time domain samples may be used to generate a frequency domain representation in block 402, but generally not used to generate a channel estimate in block 404. Essentially, block 401 in FIG. 4 receives the time domain samples and the frequency domain representation is generated in block 402 and the channel estimate is generated in block 404. A channel estimate is not generated in block 402.

The data symbols can be from a single carrier communication system. In block 402, this data is used to generate a frequency domain representation of the sampled data by performing a pN point discrete Fourier transform of the samples. In one embodiment, the channel estimate is generated in block 404. However, in another preferred embodiment, method 400 does not generate channel estimate and block 404 may be optional.

The Fourier transform of the samples is performed at a p/T sampler output. As part of block 402, the processor may generate a frequency domain representation of r(kT/p). The symbols are transmitted at a rate of 1/T, which is the period, where p is the sampling rate, where k is a constant, and r is an output of a transmitted signal after passing through a formula as expressed by $$r(t) = \sum_m a_m g_{ch}(t - mT) + z(t).$$

The processor also generates a channel estimate in block 404 utilizing the data samples received. The channel estimate may be accomplished using any known or standard channel estimate methodology using received pilot signals. The channel estimate generated in block 404 may be based on another portion of the data samples, e.g., the data samples of pilot symbols, received, based on the frequency domain representation of the FFT transform, or based on a computed index. In another embodiment, the channel estimate generated in block 404 may be based on another portion of the data samples, e.g., the data samples of pilot symbols from a different algorithm. The output of block 402 and block 404 may be provided to block 406. In block 406, the processor computes the frequency response of a zero-forcing or minimum-mean-square equalizer. Based on the results given above, a frequency domain equalizer should have a frequency response that is an estimate of the frequency response of the optimal equalizers. The present system may obtain the frequency response of frequency domain equalizer by substituting a channel estimate, obtained from a training sequence as discussed herein. The training sequence may be preloaded into an index in a storage medium or may be provided in real time from a communication system.

In block 408, the processor may multiply a conjugate of the computed frequency response of the channel with a frequency domain representation for each pair of samples to generate a product value. In block 409, alias computational operations are performed on one or more product values. In block 410, the processor generates N-aliased frequency domain values from the generated product value for each of the samples in a transition band. In determination block 411, the processor may determine if there are more samples to receive. If there are more samples (i.e., determination block 411="Yes"), the processor may receive the next samples at block 413 and return to block 402.

If a substantial portion of the samples are receiver (i.e., determination block 411="No"), the processor may perform an inverse Fourier transform on the domain values at block 412. In this operation the processor may optionally perform an N point inverse discrete Fourier transform on the generated N-aliased frequency domain values to generate estimates of a transmitted time domain data symbol. In block 414 the processor may decode the estimated symbols into the corresponding data bits which may be processed.

As is well known, the Fourier transform is a mathematical operation that decomposes a signal into its constituent frequencies. The Fourier transform of the data, which is sampled, is a mathematical representation of the amplitudes of the individual symbols that make up the data. The original signal depends on time, and therefore is called the time domain representation of the signal, whereas the Fourier transform yields the frequency components of the signal, and thus is called the frequency domain representation of the signal. The term Fourier transform may refer both to the frequency domain representation of the signal and the process that transforms the signal to its frequency domain representation.

The Fourier transforms complex variables suitable for communication. The Fourier transform decomposes a function into oscillatory functions. The Fourier transform and its generalizations can be provided for analysis. Both the time and frequency domains may be analyzed. It is possible to define the Fourier transform of a function of several variables. It is also possible to generalize the Fourier transform on discrete structures such as finite groups.

In one embodiment, the Fourier transform can utilize one of the well known fast Fourier transform (FFT) algorithms, including for example a Cooley-Tukey FFT algorithm, a Good-Thomas FFT algorithm, a Rader-Brenner FFT algorithm, a Bruun's FFT algorithm, or a Winograd FFT algorithm. In another embodiment, different algorithms may be applied to output a frequency domain representation to generate the channel estimate. In another embodiment, a modified FFT algorithm may be used that is optimized for the device processor. In another embodiment, the inverse Fourier transform performed on the domain values to generate the estimate of the time domain data symbols may utilize an inverse Cooley-Tukey FFT algorithm, or an inverse Good-Thomas FFT algorithm, an inverse Rader-Brenner FFT algorithm, an inverse Bruun's FFT algorithm, or an inverse Winograd FFT algorithm.

In another embodiment, a different algorithm may be used to generate the estimate of the time domain data symbols. In another embodiment, algorithms may not be used to output a frequency domain representation to generate the channel estimate nor to generate the estimate of the time domain data symbols. In that embodiment, the processor may compare data and access an index to output the frequency domain representation or may compare the data to an index to generate the estimate of the time domain data symbols.

Algorithms that may be used for the inverse Fast Fourier transform (IFFT) computation may be changed depending upon several factors in the data sample. For example, depending on whether the block input is in bit-reversed order one algorithm may be used, while if the data is in conjugate symmetric order another algorithm may be used, and if both bit-reversed order and conjugate symmetric order another algorithm may be used. For example, the inverse Fast Fourier transform computation may include Bit-reversal operations, Double-signal algorithms, a Half-length algorithm, a Radix-2 decimation-in-time (DIT) algorithm, or another algorithm, depending on the data.

In another embodiment, bounds may be placed on the Fast Fourier transform and the inverse Fast Fourier transform. Such bounds may depend on the computational power of the computing device and processor.

Figure 5:
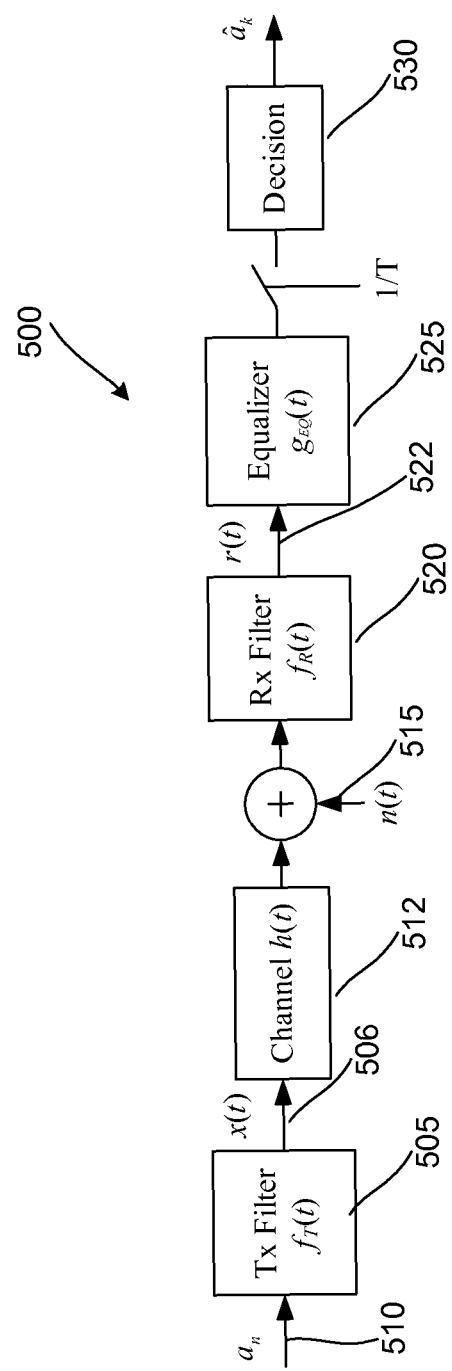
FIG. 5 illustrates a system for estimating transmitted time domain data symbols using an equalizer according to an embodiment.

FIG. 5 shows a high level block diagram of a communication system path 500 from transmission of data symbols through decoding of received symbols in a receiver. Data symbols $a_n$ 510 are passed through a transmission filter (Tx filter) which may be a three-element filter that has a 'T' or 'it' topology. The transmission filter 505 may be a low-pass filter, a high-pass filter, a band-pass filter, or a band-stop characteristic filter. The transmission filter 505 components may be symmetric or not, depending on the required frequency characteristics. A high-pass transmission filter 505 may have very low impedance at high frequencies, and very high impedance at low frequencies. In this way the transmission filter 505 can be inserted in a transmission line, resulting in the high frequencies being passed to the transmission channel while low frequencies are reflected. The transmission filter 505 outputs a base band transmitted signal 506 that is expressed as:

$$x(t) = \sum_n a_n f_T(t - nT).$$

The data symbols $\alpha_n$ may be expressed by zero mean and independent symbols, which are transmitted at a rate of 1/T, is also called a baud rate. Various transmission rates are possible and within the scope of the various embodiments.

The data symbols may be transmitted via a communication channel module 512, which includes all of the losses and gains of the path through the transmitter, the antenna and the space between the transmitter and receiver. In addition to the signal arriving via the channel 512 noise n(t) 515 from a variety of sources also arrives at the receiver front end 520. The receiver typically includes a front end filter $f_R(t)$ 520. The receiver front end filter preferably whitens the added noise. The output 522 of the receiver filter 520 may be expressed as:

$$r(t) = \sum_m a_m g_{ch}(t - mT) + z(t).$$

In the foregoing equation z(t) represents a white additive Gaussian noise and $g_{ch}(t)$ denotes the composite channel impulse response, which is the convolution of $f_T(t)$, h(t) and $f_R(t)$. In the receiver an equalizer 525 receives the r(t) output from the receiver circuit and outputs a symbol to a decision block 530 which determines the most likely symbol based on the equalized received signal. The decision block 530 outputs the data symbols $\{\hat{\alpha}_k\}$. To recover the original transmitted symbols $\alpha_n$, the received signal r(t) is processed by the equalizer 525 with the impulse response $g_{EQ}(t)$. The equalizer 525 output is sampled by the decision block 530 at the symbol rate 1/T. The sampled output provides the estimates of the corresponding transmitted symbols $\{\hat{\alpha}_k\}$. In an ideal case the equalizer 525 generated estimates are very accurate and close, if not identical, to the originally transmitted symbols $\{\alpha_k\}$ 510.

The Fourier transform of $g_{eq}(t)$ and $g_{ch}(t)$ by $G_{eq}(f)$ and $G_{ch}(f)$ in one embodiment is accomplished using one out of at least two different equalizers 525. For example, the equalizer 525 may be an optimal equalizer that is a zero-forcing (ZF) equalizer or a minimum mean square error (MMSE) equalizer. It should be appreciated that the equalizer 525 may be a zero-forcing (ZF) equalizer or the equalizer 525 can be a MMSE equalizer 525. However, the ZF equalizer 525 and the MMSE equalizer 525 are not used generally at the same time but, in a less preferable exemplary embodiment, the MMSE and the ZF equalizer 525 may be used together. The output of a zero-forcing equalizer is the unbiased estimate of the original transmitted symbols, i.e., (1) $E[\hat{\alpha}_k] = \alpha_k$.

The zero forcing equalizer 525 is nearly optimal if the received signal has a high signal to noise ratio (SNR). However, if the signal to noise ratio is not within a predetermined range, an equalizer 525 based on a minimum mean square error (MMSE) criterion may generate better performance. Various equalizer parameters and selection criterion are possible and within the scope of the various embodiments.

Figure 6A:
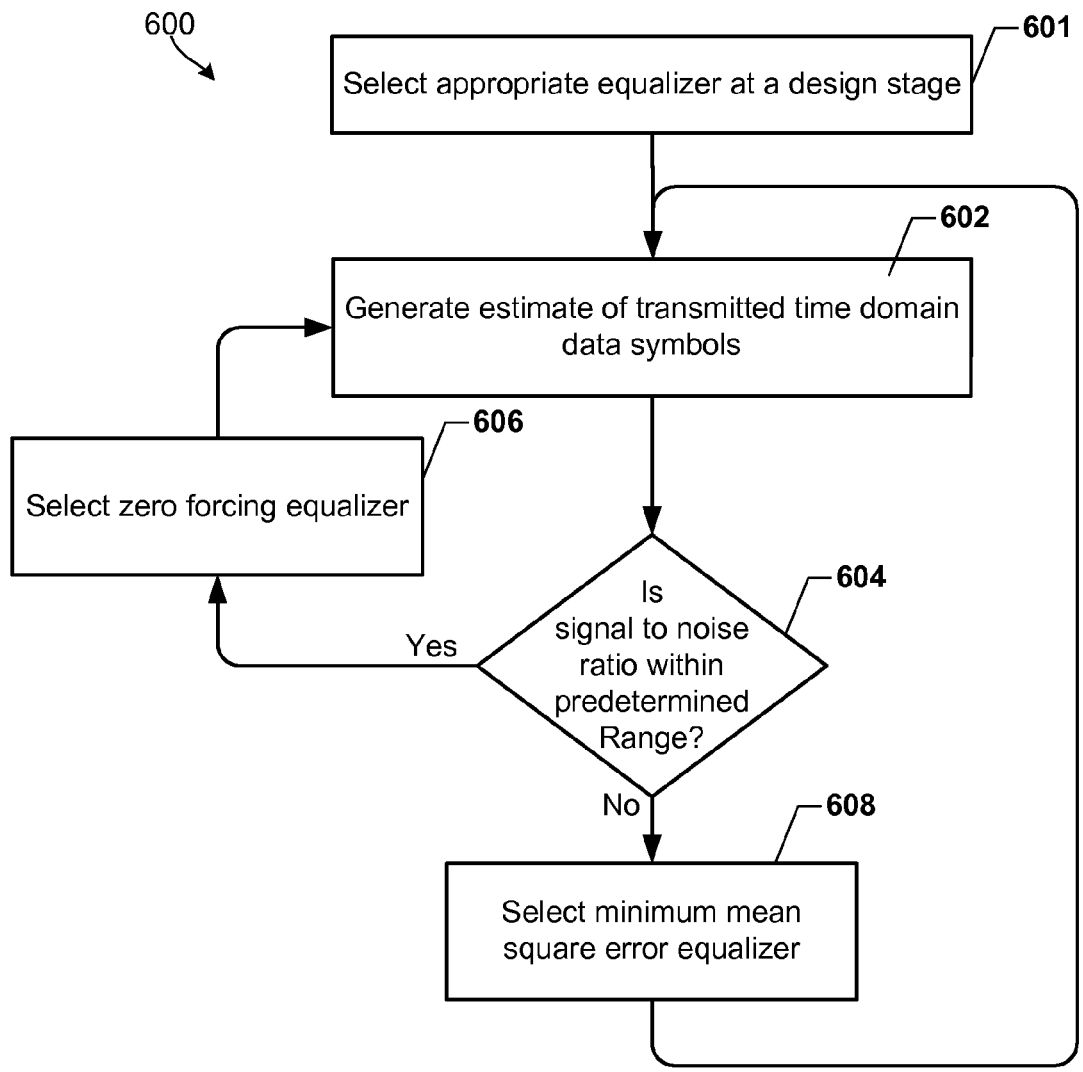
FIG. 6A is a process flow diagram of an embodiment method for setting or selecting an equalizer based on a predetermined selection or based on a signal to noise ratio.

FIG. 6A illustrates an embodiment method 600 for recognizing received data symbols in which the type of equalizer is determined based upon the signal to noise ratio at a design stage. The signal may have noise variation and a suitable equalizer may be selected at a design stage for practical considerations. Method 600 may in one embodiment be performed at a design stage and generally not in real time and preferably the equalizer is selected at a design stage and utilized and generally is not selected, updated, nor changed according to real time parameters.

In method 600, the processor may commence operation by selecting a predetermined or default equalizer at block 601. For example, in block 601 the process may begin by selecting either a zero forcing equalizer or a minimum mean square equalizer. In block 602 the receiver circuit may begin receiving data and generating estimates of the transmitted data symbols. In decision block 604, the processor may compare the signal to noise ratio detected in the incoming signal to determine whether it is within a predetermined range or threshold. If so (i.e., decision block 604="Yes") which indicates that the zero forcing equalizer will provide better performance, the receiver circuit or processor may select the zero forcing equalizer in block 606 and continue receiving and processing data symbols at block 602. On the other hand, if the detected signal to noise ratio exceeds the predetermined range or threshold (i.e., decision block 604="No"), which indicates that the minimum mean square error equalizer will provide better performance, the receiver circuit or processor may select the minimum mean square error equalizer in block 608 and continue receiving and processing data symbols at block 602. The ZF or MMSE equalizer 525 selected may be selected at the design stage and implemented.

Figure 6B:
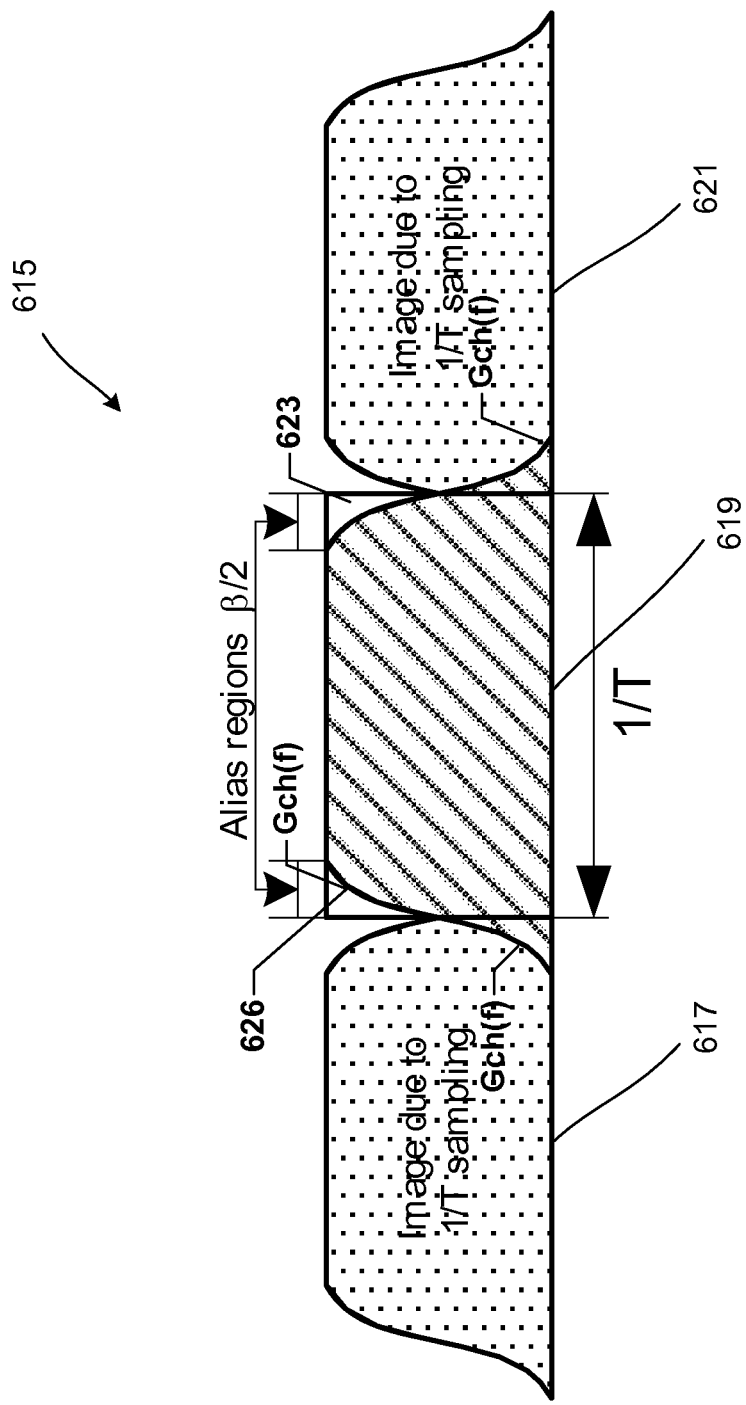
FIG. 6B is a representation of alias regions of a 1/T sample located between image samples.

FIG. 6B shows a graphical depiction of aliasing due to sampling. In signal processing, aliasing refers to an effect that causes different signals to become indistinguishable (or aliases of one another) when sampled. It also refers to the distortion or artifact. This may result when the signal reconstructed from samples is different from the original continuous signal. It should be appreciated that the sample merely shows one portion of the continuous signal.

Actual signals have finite time duration and frequency content. The frequency content as defined by the Fourier transform may have no upper bound. Some amount of aliasing may occur when such functions are sampled. Functions whose frequency content is bounded (band limited) have infinite duration. If sampled at a high enough rate, determined by the bandwidth, the original function may be perfectly reconstructed from the infinite set of samples.

Referring to FIG. 6B, generally the alias representation 615 includes a first image due to 1/T sampling 617 and a second image 621 due to 1/T sampling. Disposed between the first and the second images 617 and 621 is a region 619 defined as 1/T with two alias regions, each of which has a width of β/2, in region 619 shown as reference numerals 623 and 626. With the overall channel frequency response denoted by $G_{ch}(f)$ (which is the curved shape portion shown in FIG. 6B), the frequency response of the optimal zero forcing equalizer 625 satisfies the following equation:

$$G_{eq}(f) = \frac{TG_{ch}^*(f)}{\sum_{m=-\infty}^{\infty} |G_{ch}(f + m/T)|^2}. \qquad (1)$$

Figure 7:
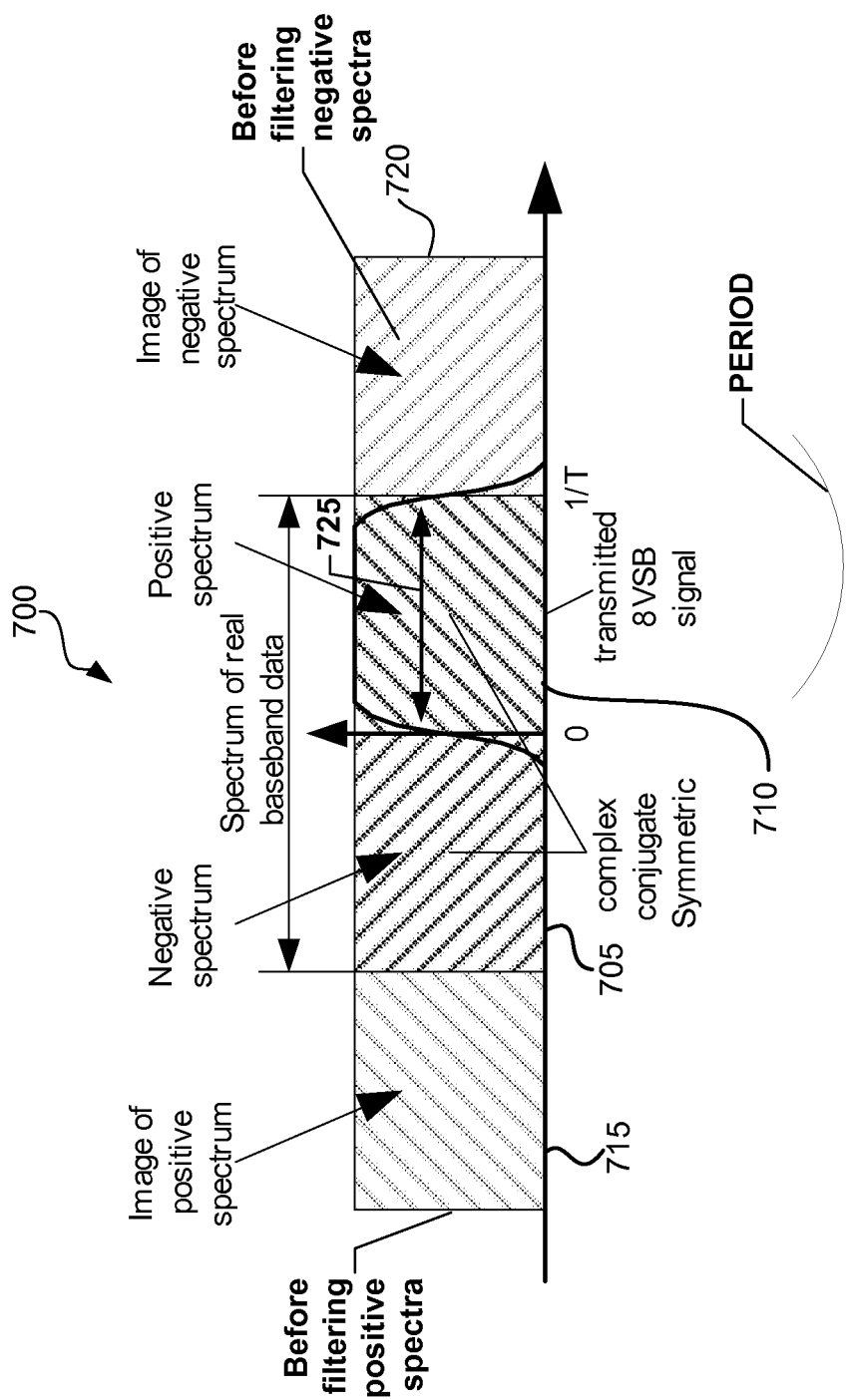
FIG. 7 is a representative plot of a spectrum of real baseband data.

In ATSC, the signal is real and then is sampled. FIG. 7 shows a real sampled signal. For example, the real signal is sampled at a rate over 2/T and the sampled signal forms a spectral periodic repetition. Portion 710 of an ATSC signal resembles the portion 710 or a positive spectrum 715 and a negative spectrum 720 which is a complex conjugate and flipped section of the real signal. It is thus repeated in the channel. Thus, if repeated for every period T, portion 715 is the same as portion 710 but shifted in frequency. Before filtering, one can reconstruct the signal using only one portion of the signal and the system can recover the entire signal. Here, in ATSC, if the system transmits the real signal as shown by the period 2/T, the receiver can reconstruct the signal. It should be appreciated that $G_{ch}(f)$ corresponds to the curved shaped portion shown in FIG. 6B or the distortion on the signal caused by the channel. As can be seen in the figure, the signal curves upwardly, plateaus, and then curves downwardly and wider and $G_{ch}(f)$ traverses in past the period 1/T. The method would desire a rectangular portion rather than having the additional curve on the bottom side as the curve cuts into the before and after regions of the signal. This causes a distortion in the channel and the method recovers the portion by performing an alias operation on product values. The signal is filtered and passed through and recovered to add a portion at the back to lower distortion and for increased quality. In the case that the additive noise is exceeds a threshold where the zero forcing equalizer is not optimum the minimum mean square equalizer may be used which has a frequency response given by:

$$G_{eq,MMSE}(f) = \frac{G_{ch}^*(f)}{\frac{1}{T}\sum_{m=-\infty}^{\infty} |G_{ch}(f+m/T)|^2 + \phi_z(f)} \quad (2)$$

where $\phi_z(f)$ is the power spectrum of the noise z(t) at the receiver filter output. The power spectrum $\phi_z(f)$ is generally frequency dependent, but in most cases it can be assumed to have a predetermined constant value, i.e., the noise is white, even if the receiver front end filter 520 (FIG. 5) is not an optimal noise whitening filter. Referring to equations 2, 3, and 4, a time domain multiple mean square error equalizer converges to the frequency characteristic given by equation (4) above.

Based on the results given above, a frequency domain equalizer should have a frequency response that is an estimate of the frequency response of the optimal equalizers given by equations (3) and (4) listed above. The present system may obtain the frequency response of frequency domain equalizer by substituting a channel estimate, obtained from a training sequence into the corresponding equations (3) or (4). The denominator on the right side of equation (4) is the aliased power spectrum of $G_{ch}(f)$. Thus, it is relatively flat and the precision of calculation is not affected by the roll off at the band-edges shown in FIG. 6B. This feature facilitates the implementation of frequency domain equalizer 525.

The receiver circuit receives sampled signals according to a predetermined sample size and a predetermined sample rate, which may vary. With a properly selected receiver front end filter and sampling rate p/T, p>1, performance of the equalizer generally may not depend on sampling timing and an equalizer of FIG. 5, and the selection thereof is independent of sampling time phase. The sampling is at least as good, or better, than a symbol rate equalizer with optimal sampling phase. The minimum mean square equalizer output usually does not satisfy Equation (1). It is possible that the minimum mean square equalizer output may generate a biased estimate based on factors associated with a number of parameters of the communication system. While it is usually not a problem for decoding BPSK, QPSK or MPSK modulation symbols and/or at high signal to noise ration, the performance could degrade. This may occur if the channel signal to noise ratio is low and multilevel AM or QAM modulations are used. The receiver filer performance is, in another embodiment, further improved by estimating and removing the bias, i.e., to implement an unbiased minimum mean square equalizer 525.

For a zero forcing equalizer, in order for: $E[\hat{\alpha}_k]=\alpha_k$ (3) to be true, it is necessary for $\tilde{G}(f)$, or the frequency response of the overall channel from the filter input to the 1/T sampler output to satisfy the following equation:

$$\tilde{G}(f) = T|f| \le T/2$$

If $\tilde{G}(f)=T|f|\le T/2$ is satisfied, the estimate is considered to be unbiased. However, practically and in real world actual conditions, the right side needs to be a constant but not necessary equal to T. In such a case, the estimate will be scaled by a constant value of const/T. It should be appreciated that this correction or scaling is taken into account below for real world conditions. Various real world conditions are possible and within the scope of the present disclosure. Since G(f) is the frequency response of the overall channel sampled at 1/T, the frequency response is the aliased spectrum of $G(f)=G_{ch}(f) \times G_{eq}(f)$. Namely, $$\tilde{G}(f) = \sum_{m=-\infty}^{\infty} G(f+m/T) \quad (4)$$

which is periodic with a period of 1/T.

FIG. 6B illustrates generated N aliased frequency domain values of the product that are generated by channel estimates. In most practical system designs, the channel estimate is generated from known (e.g., pilot) symbols. Since these known symbols are passing through the same underlying physical channel as data symbols, the channel estimate is indeed the same as the channel through which the data symbols are passing. To accomplish this, a time domain channel estimate is usually first generated utilizing the pM samples corresponding to the M pilot symbols. It can be performed in one embodiment by correlating the pM samples with known M transmitted pilot symbols. A discrete Fourier transform or "DFT" of the channel estimate generates the frequency domain channel estimate, and the frequency response using the equalizer may be determined. The equalizer frequency response may be multiplied with the determined Fourier transform output of the data's frequency domain representation. Similar to the aliasing operations on the channel frequency response, an aliasing operation is performed on product values. Inverse discrete Fourier transform is performed on one period of the aliased product domain values to generate the data sample estimates as shown in block 409.

FIG. 7 illustrates a frequency domain characteristic of an 8-VSB signal with a spectrum of real baseband data generally shown as reference numeral 700. The spectrum of real baseband data 700 includes a negative spectrum portion 705 and a positive spectrum portion 710. Additionally, adjacent to the negative spectrum portion 705 is an image of positive spectrum portion 715. Adjacent to the positive spectrum portion 710 is an image of the negative spectrum portion 720. ATSC employs 8-VSB modulation. 8VSB is the modulation method used for broadcast in the ATSC digital television standard and ATSC and 8VSB modulation is used primarily in North America; in contrast, the DVB-T standard uses COFDM. The real signal is spectrally repeated and may be symmetric in a mirror image as positive frequency and negative frequency portions in flipped and conjugated portions so that portion 720 is the same as portion 705 and portion 715 is the same as portion 710 but shifted in frequency. Thus, if one portion 715 is known the entire signal may be reconstructed.

A modulation method specifies how the radio signal fluctuates to convey information. ATSC specifies the modulation used for over-the-air digital television as compared to QAM. 8VSB is an 8-level vestigial sideband modulation. 8VSB is capable of transmitting three bits ($2^3=8$) per symbol by amplitude modulating a sinusoidal carrier to an intermediate frequency. The resulting signal is band-pass filtered with a Nyquist filter to remove redundancies in the side lobes, and again modulated to the broadcast frequency. The Nyquist filter also removes redundant data that may contribute to aliasing. Vestigial sideband modulation (VSB) is a modulation method which attempts to eliminate the spectral redundancy of pulse amplitude modulated (PAM) signals. Modulating a real data sequence by a cosine carrier results in a symmetric double-sided pass band spectrum. The symmetry implies that one of the sidebands is redundant, and removes one sideband with an ideal brick wall filter should preserve the ability for perfect demodulation. As brick wall filters with zero transition bands are not physically realized, the filtering implemented in attempting such a scheme leaves a portion of a redundant sideband. The 8VSB signal transmitted with a filter is shown in FIG. 7. Before filtering using the transmitter $T_x$, the positive and negative spectra are the rectangular potions 715 and 720 as shown in FIG. 7. The spectrum of transmitted signal is the portion of the spectrum under the filter shape, i.e., it contains portions of the positive spectrum 710 and the negative spectra 720 and 705 generally shown as reference numeral 725.

ATSC signals use the same 6 MHz bandwidth as analog NTSC television channels. Once the digital video and audio signals are compressed and multiplexed, the transport stream is modulated in different ways depending on the method of transmission. In such a system, the data transmitted is 8 level amplitude modulated symbols.

Since the data symbols are real, the Fourier transform of the data symbols is complex conjugate symmetric with respect to the y-axis as shown in FIG. 7 which includes a negative spectrum portion 705 and a positive spectrum portion 710. As a result, the data is recovered either from the positive portion 710 or the negative portion 705 of the frequency components. For example, once the receiver recovers the positive frequency components 710 and 715, the original data is recovered by appending the negative spectrum 705 and 720 and performing an inverse FFT of one period of the composite frequency components 720, 710, 705 and 715 to generate the transmitted real data symbols. In the 6 MHz (megahertz) channel used for broadcast ATSC, 8VSB carries a symbol rate of 10.76 Mbaud, a gross bit rate of 32 Mbit/s, and a net bit rate of 19.39 Mbit/s of usable data. The net bit rate is lower due to the addition of forward error correction codes and the insertion of pilot symbols. The eight signal levels are selected with the use of a trellis encoder. In another embodiment, the various embodiments may encompass other modulations including but not limited to modulation using 2VSB, 4VSB, and 16VSB.

Figure 8:
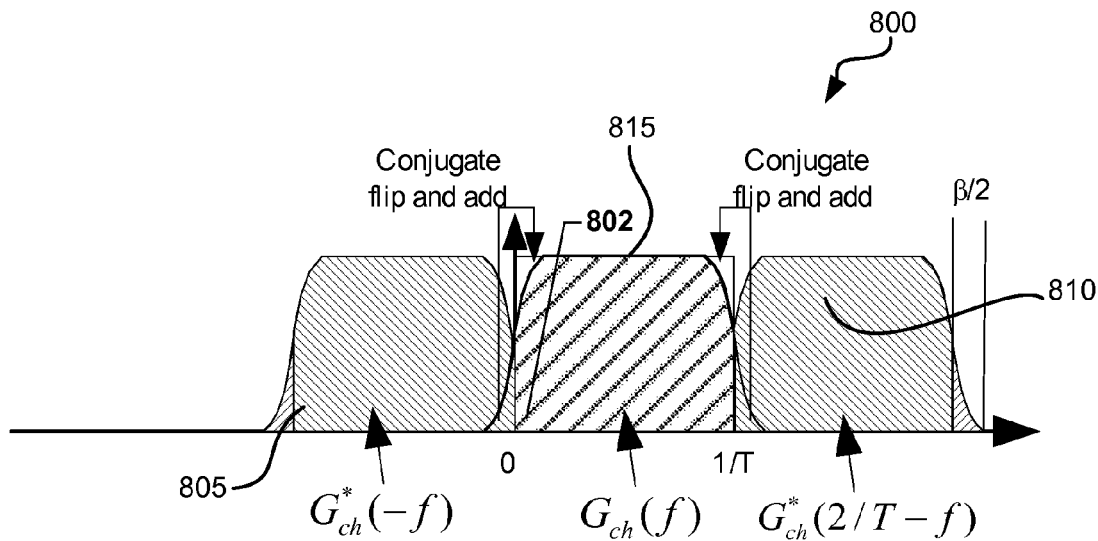
FIGS. 8-9 are representative plots of a spectrum of real baseband data illustrating conjugate flip and add operations.

FIG. 8 shows another frequency domain characteristic of an 8-VSB signal illustrated with a conjugate flip and add portion 805 and 810. Portion 802 illustrates a portion of spectrum under the filter envelope 805, 810, 815 to indicate the positive and negative spectra of the original data symbols. Portion 815 is from 0 to 1/T. However, the portion under the curve 802 extends past 0 and also past 1/T. After aliasing, a period portion 815 extends from 0 to 1/T. The optimal frequency domain equalization of 8-VSB signal is very similar to the conventional frequency domain equalization of FIG. 6B. In FIG. 8, the spectrum of the received signal, i.e., the FFT of the received data samples is the portion under the filter envelope denoted by 802. The frequency domain representation 800 of the transmitted data symbols are conjugate symmetric around frequencies 0 and 1/T and periodic with a period of 2/T as shown by portions 815, 805 and 810. Thus to recover the negative frequency components 805 of the original signal, the system performs a conjugate, flip and add of the frequency components 802 and others below 0 and above 1/T after equalization after portion 810.

Namely, instead of using the term $$\sum_{m=-\infty}^{\infty} |G_{ch}(f+m/T)|^2$$

in the denominator, the formula used is:

$$|G_{ch}(f)|^2 + \left|G_{ch}\left(\frac{2}{T}-f\right)\right|^2$$

for $$\frac{1}{T} - \frac{\beta}{2} < f < \frac{3}{2T}$$

and $|G_{ch}(f)|^2 + |G_{ch}(-f)|^2$ for $$-\frac{1}{2T} < f < \frac{\beta}{2}$$

where β is the excess bandwidth.

Figure 9:
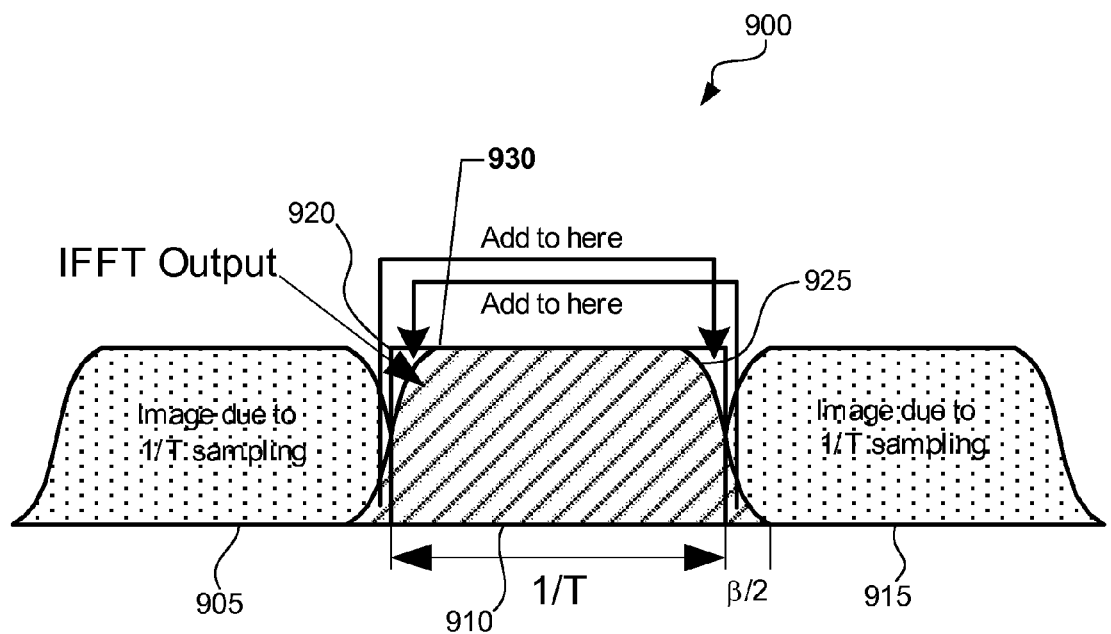

FIG. 9 illustrates a frequency domain value having a first, a second and a third portion 905-915 where a period of the second portion 910 is 2/T and the first portion 905 and third portions 915 are images related to the 2/T sampling. Various sampling is possible and within the scope of the present disclosure.

A received signal sample spectrum or an FFT output is the portion of under the filter envelope generally shown as reference numeral 930. The channel estimate also is a portion that is located under the filter envelope 930. The spectrum contains both positive and negative spectrum portions 905 and 915. After the channel frequency response is generated, a half period section 910 is generated. The channel frequency response 910 (before aliasing) is multiplied by the frequency domain representation of the signal, i.e., the FFT output of the received data samples, sample by sample. This operation is called phase equalization. The phase equalized signal spectrum is provided as an aliasing operation to essentially flip the tail portions 925 of the signal and add it to the spectrum to reflect the squared portion 920 of the original signal as the channel frequency response shown in FIG. 9. The resulting spectrum is divided by the aliased channel frequency response plus the aliased noise spectrum. This operation is called amplitude equalization. Since the generated spectrum data is periodic and symmetric only a half of a period may be needed, which is advantageous in an embodiment. The half period of the phase and amplitude equalized spectrum with width of T is conjugated, flipped and appended to form one period of the equalized signal spectrum. The inverse DFT of the period of the equalized spectrum is the recovered data. In a further embodiment when data blocks with the cyclic prefix are not used, edge effects may be avoided by applying a finite Fourier Transform on overlapped data segments.

In another embodiment, a fast Fourier transform or inverse transform is used on a full sample. However, in another non-limiting embodiment, a fast Fourier transform or inverse Fourier transform is performed on less than a full sample, and is performed on a subset of the sample. For example, a fast Fourier transform or inverse Fourier transform is performed on odd/even samples. An aspect of the various embodiments is to generate an estimate of the transmitted time domain data symbols using odd/even sample FFTs that is equivalent to method 400 discussed above with reference to FIG. 4.

The sampling rate may be 2/T in the digital implementation and there may be 2N samples in each block for a frequency domain equalizer as discussed above. The odd/even sample methods perform an N point Fourier transform on the N even samples and N odd samples of the received signal, respectively. The same N point Fourier transform operations are performed on the even and odd sampled estimated channel impulse response.

For a 2N point FFT, the $k^{th}$ sample of the Fourier transform output is expressed as:

$$x(k) = \sum_{n=0}^{2N-1} x(n) e^{-j2\pi kn/2N}.$$

Similarly for an N point Fourier transform:

$$x(k) = \sum_{n=0}^{N-1} x(n) e^{-j2\pi kn/N}.$$

For an N point Fourier transform on the even samples, the $k^{th}$ output is:

$$x_e(k) = \sum_{n=0}^{N-1} x(n) e^{-j2\pi kn/N}.$$

The $k^{th}$ data sample of the N-point Fourier transform on odd samples is:

$$x_o(k) = \sum_{n=0}^{N-1} x(2n+1) e^{-j2\pi kn/N}$$

After mathematical manipulations, it can be shown that the $k^{th}$ output of the 2N point FFT can be expressed as:

$$x(k) = x_e(k) + e^{-j\pi k/N} x_o(k)$$

Similarly, the $(k+N)^{th}$ output is expressed as:

$$x(k+N) = x_e(k+N) + e^{-j\pi(k+N)/N} x_o(k+N) = x_e(k) - e^{-j\pi k/N} x_o(k)$$

As a consequence, the 2N point FFT outputs of the channel estimate with a conjugate is:

$$c^*(k) = c_e^*(k) + e^{j\pi k/N} c_o^*(k)$$

$$c^*(k+N) = c_e^*(k) - e^{j\pi k/N} c_o^*(k)$$

To perform the frequency domain equalizer portion, the conjugate of the frequency domain channel estimate is multiplied with the output of data sample Fourier transform for each output. Aliasing is performed to yield N aliased samples, which are expressed as:

$$\begin{cases} y(k) = c^*(k) r(k) & |k| \le N(1-\beta)/2 \\ y_{alias}(k) = c^*(k) r(k) + \dfrac{c^*((k+N)_{mod\,2N})}{r((k+N)_{mod\,2N})} & \begin{cases} N(1-\beta)/2 < k \le N/2 \\ -N/2 < k < -N(1-\beta)/2 \end{cases} \end{cases}$$

Using the expressions of $c^*(k)$ and $c^*((k+N)_{mod\,2N})$ given above, the aliased samples showing above can be expressed as:

$$y_{alias}(k) = 2c_e^*(k) r_e(k) + 2c_o^*(k) r_o(k) \qquad (5)$$

where $c(k)$'s and $r(k)$'s are Fourier transform outputs of the channel estimates and the data samples, respectively. The last equation shown above is used for an aliasing region. Even though it is also valid for the other parts of the spectrum, it is probably more desirable to use the product of $c^*(k) = c_e^*(k) + e^{j\pi k/N} c_o^*(k)$ and a signal portion thereof, such that $$y(k) = c^*(k) r(k) = [c_e^*(k) + e^{j\pi k/N} c_o^*(k)] [r_e(k) + e^{-j\pi k/N} r_o(k)] \qquad (6)$$

Because a portion outside the transition band does not contain any signal components, the portion outside of the transmission band is treated as zero. Even though the noise in these samples is removed by baseband filtering, it is always possible that there are residual errors and quantization errors to degrade receiver performance. As a result, using this formulation can also reduce baseband filtering requirements. The computation of the denominator, denoted, by d(k), is also provided. A substitute c(k) is made in place of r(k) in (7) and (8) to obtain:

$$\begin{cases} d(k) = |c_e^*(k) + e^{j\pi k/N} c_o^*(k)|^2 & |k| \le N(1-\beta)/2 \\ d(k) = 2|c_e(k)|^2 + 2|c_o(k)|^2 & \begin{cases} N(1-\beta)/2 < k \le N/2 \\ -N/2 < k < -N(1-\beta)/2 \end{cases} \end{cases}$$

Figure 10:
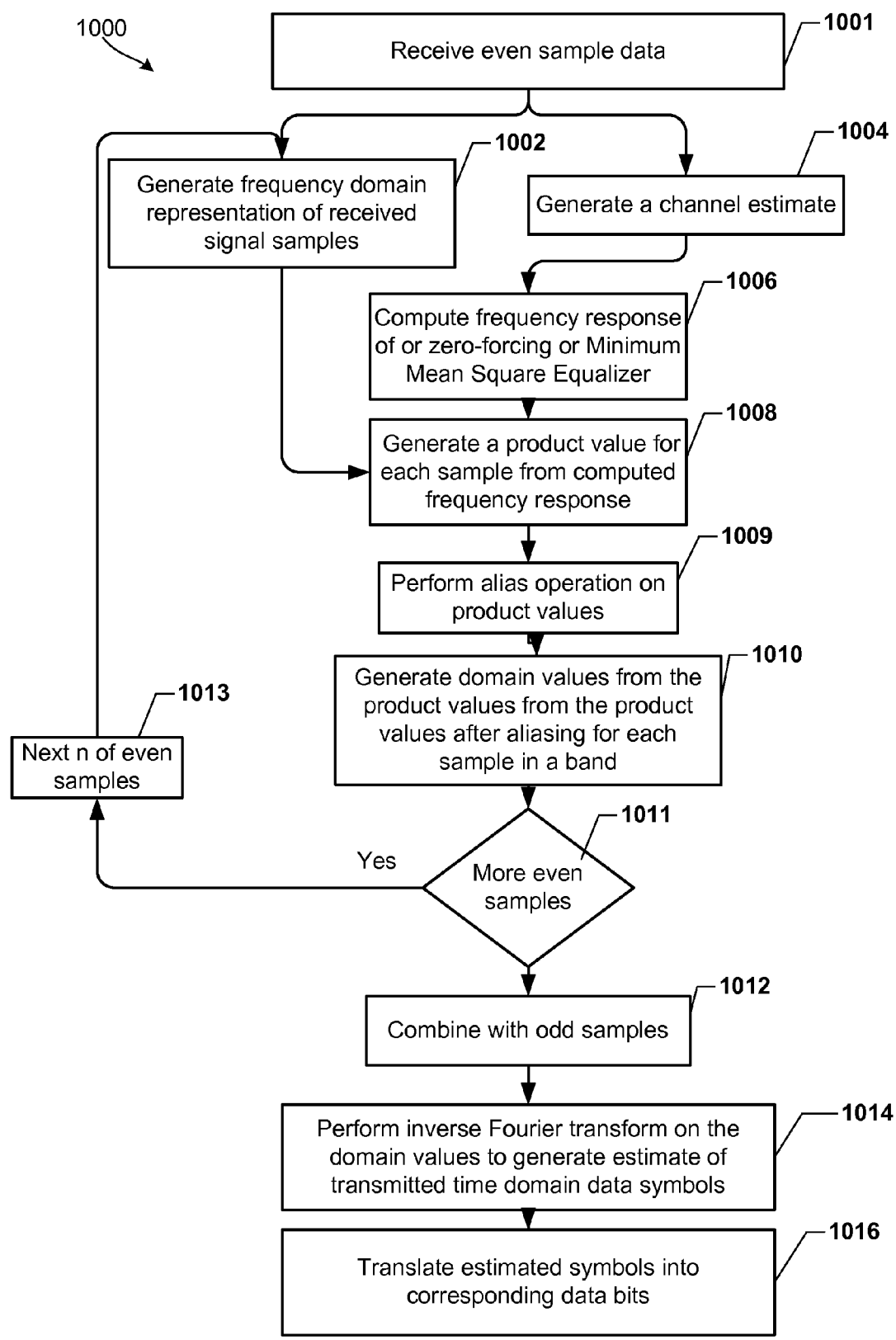
FIG. 10 is a process flow diagram of an embodiment method for receiving data symbols from a wireless transmission utilizing only even data samples.

FIG. 10 illustrates an embodiment 1000 in which an even set of samples are used for an optimal equalizer design. Method 1000 may be implemented in a receiver device that includes a receiver circuit or processor configured with processor-executable instructions to implement the method operations. The method 1000 may be used for an optimized linear equalizer for use in a single carrier communication system. Specifically, method 1000 involves single-carrier frequency-domain equalization of a band limited channel response in the presence of multipath interference using only a set of even samples.

In method 1000 at block 1001, a receiver circuit or processor receives signal sample data at a 2/T sampler output. For an even and odd implementation of the method 1000, p is equal to 2. In embodiment method 1000, a channel estimate is generated in block 1004. Time domain samples are provided to blocks 1002 and 1004. The time domain samples of the even sample data may be supplied to block 1002 and block 1004. Also as part of block 1002 a frequency domain representation of r(kT) is generated, where symbols are transmitted at a rate of 1/T, k is the sample time index and r is an output of a transmitted signal after passing through the channel and receiver, which may be expressed as $$r(t) = \sum_m a_m g_{ch}(t - mT) + z(t).$$

In one embodiment, the channel estimate block 1004 and the generated frequency domain representation 1002 may receive time domain samples. In another embodiment, the channel estimate block 1004 is optional. Block 1001 in FIG. 10 receives the time domain samples, the frequency domain representation is generated in block 1002 and the channel estimate is generated in block 1004. A channel estimate is not generated in block 1002. The frequency domain representation and channel estimate may be passed to block 1008 to generate a product value for each sample from a computed frequency response. Channel estimate block 1004 receives time domain samples. At block 1006 the frequency response of a zero-forcing or minimum-mean-square equalizer may be calculated. At block 1008 a conjugate of the computed frequency response is multiplied by a frequency domain representation for each sample to generate a product value for each sample. Based on the results given above, a frequency domain equalizer should have a frequency response that is an estimate of the frequency response of the optimal equalizers.

The present embodiment method 1000 may obtain the frequency response of frequency domain equalizer by substituting a channel estimate, obtained from a training sequence as discussed. The training sequence may be preloaded into an index in a storage medium or may be provided in real time from a communication system. At block 1009, an alias operation on the product values may be performed. At block 1010 N-aliased frequency domain values are generated from the generated product value for each of the samples in a transition band. At determination block 1011 the processor may determine whether there are more even samples to receive. If there are more samples to receive (i.e., determination block 1011="Yes"), the processor may receive the next samples at block 1013 and continue processing at block 1002. Once enough samples are received (i.e., determination block 1011="No"), the receiver circuit or processor performs an inverse Fourier transform at block 1012. In another modulation scheme a different transformation may be performed. At block 1012, the estimate symbols may be combined with data bits from the odd samples. In the operations in block 1014, the receiver circuit or processor performs an N point inverse discrete or finite Fourier transform on the generated N-aliased frequency domain values to generate estimates of transmitted time domain data symbols. At block 1016 the estimated data symbols are translated into corresponding data bits for processing. A channel estimate may be used in two places; first for a numerator, and a second for a denominator. The channel estimate may be used to obtain $D_k$, and a division is done sample by for the equalized domain value; one for product and the second for the denominator for the equalized domain value.

Figure 11:
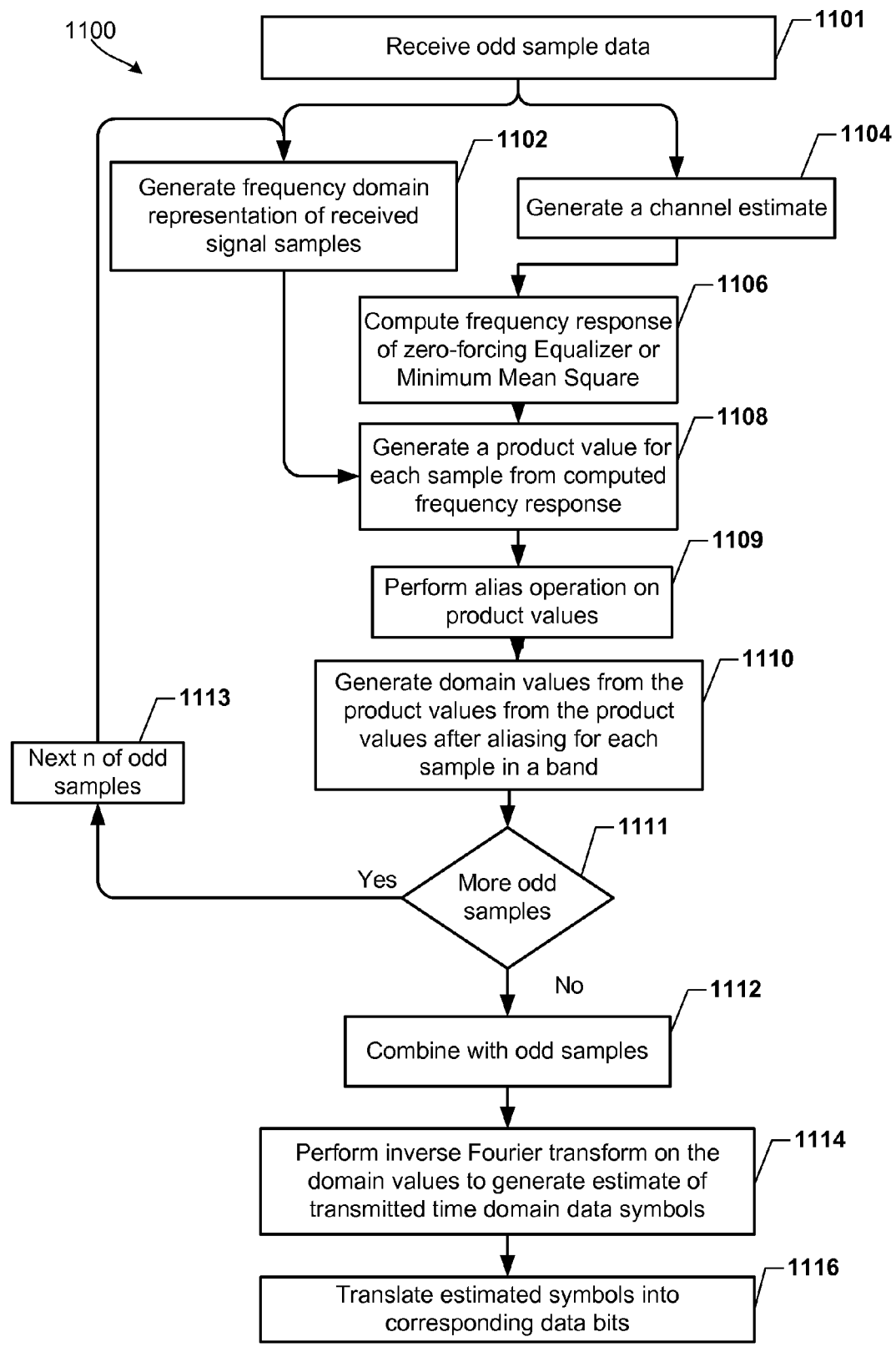
FIG. 11 is a process flow diagram of an embodiment method for receiving data symbols from a wireless transmission using only odd data samples.

FIG. 11 illustrates an embodiment 1100 in which an odd set of samples is used for an optimal frequency-domain equalization design. Method 1100 may be implemented in a receiver device that includes a receiver circuit or processor configured with processor-executable instructions to implement the method operations. The method 1100 may be used for an optimized linear equalizer for use in single carrier communication systems. Specifically, method 1100 involves single-carrier frequency-domain equalization of a band limited channel response in the presence of multipath interference using only a set of odd samples. In the embodiment method 1100, a channel estimate may be generated from time domain samples in block 1004. In another embodiment, the channel estimate block 1004 may be optional. Essentially, block 1101 in FIG. 11 receives the time domain samples and the frequency domain representation is generated in block 1102 and the channel estimate is generated in block 1104. A channel estimate is not generated in block 1102.

In method 1100 at block 1101, a receiver circuit or processor receives signal sample data. In this operation the data is to be used to generate a frequency domain representation of the sampled data in block 1102. The output of block 1101 may be provided to both blocks 1102 and 1104. Blocks 1102 and 1104 receive time domain sample data. The processor of the computing device may perform an N point discrete Fourier transform depending on the modulation schema used, which is performed on the odd set of samples in block 1102 to generate a frequency domain representation. In block 1108, a product value for each sample may be generated from the computed frequency response. In block 1104, a channel estimate may be generated. The finite Fourier transform of the samples is performed at a 2/T sampler output down sampled to 1/T. Odd samples are generated at (kT+T/2). Also as part of block 1102 a frequency domain representation of r(kT+T/2) is generated, where symbols are transmitted at a rate of 1/T period, k is the sample time index and r is an output of a transmitted signal after passing through channel and receiver, which may be expressed by $$r(t) = \sum_m a_m g_{ch}(t - mT) + z(t).$$

At block 1106 the frequency response of a zero-forcing or minimum-mean-square equalizer may be calculated. Based on the results given above, a frequency domain equalizer should have a frequency response that is an estimate of the frequency response of the optimal equalizers. The present embodiment may obtain the frequency response of frequency domain equalizer by substituting a channel estimate obtained from a training sequence as discussed. The training sequence may be preloaded into an index in a storage medium or may be provided in real time from a communication system.

At block 1108 a conjugate of the computed frequency response is multiplied by a frequency domain representation for each sample to generate a product value. At block 1109, alias operations on the product values may be performed. At block 1110 N-aliased frequency domain values are generated from the generated product value for each of the samples in a transition band. At determination block 1111 the processor may determine whether there are more odd samples to receive. In block 1112 the data bits may be combined with even samples to obtain the corresponding data bits for processing If there are more odd samples to receive (i.e., determination block 1111="Yes"), the processor may receive the next samples at block 1113 and continue processing at block 1102. Once enough samples are received (i.e., determination block 1111="No"), the receiver circuit or processor performs an inverse Fourier transform at block 1114. It should be appreciated that the inverse Fourier transform may be replaced depending on the modulation scheme. In the operations in block 1114, the receiver circuit or processor performs an N point inverse discrete Fourier transform on the generated N-aliased frequency domain values to generate estimates of transmitted time domain data symbols. At block 1116 the estimated data symbols are interpreted and translated into corresponding data bits as discussed above with respect to equation (5) for phase equalization, (6) and (7). A channel estimate may be used in two places, first for a numerator and a second for a denominator. The channel estimate may be used to obtain Dk and a division is done sample by the equalized domain value. One for product and the second for the denominator for the equalized domain value. In another embodiment the signal samples are odd, even and can vary. For example, an output of 1012 and 1112 may be combined in one embodiment. Advantageously, the various embodiments described above do not require matrix estimation and manipulation and are easier to implement and numerically more stable than conventional methods. Care should be exercised to determine if there is a significant statistical difference between the even and odd data samples.

Figure 12:
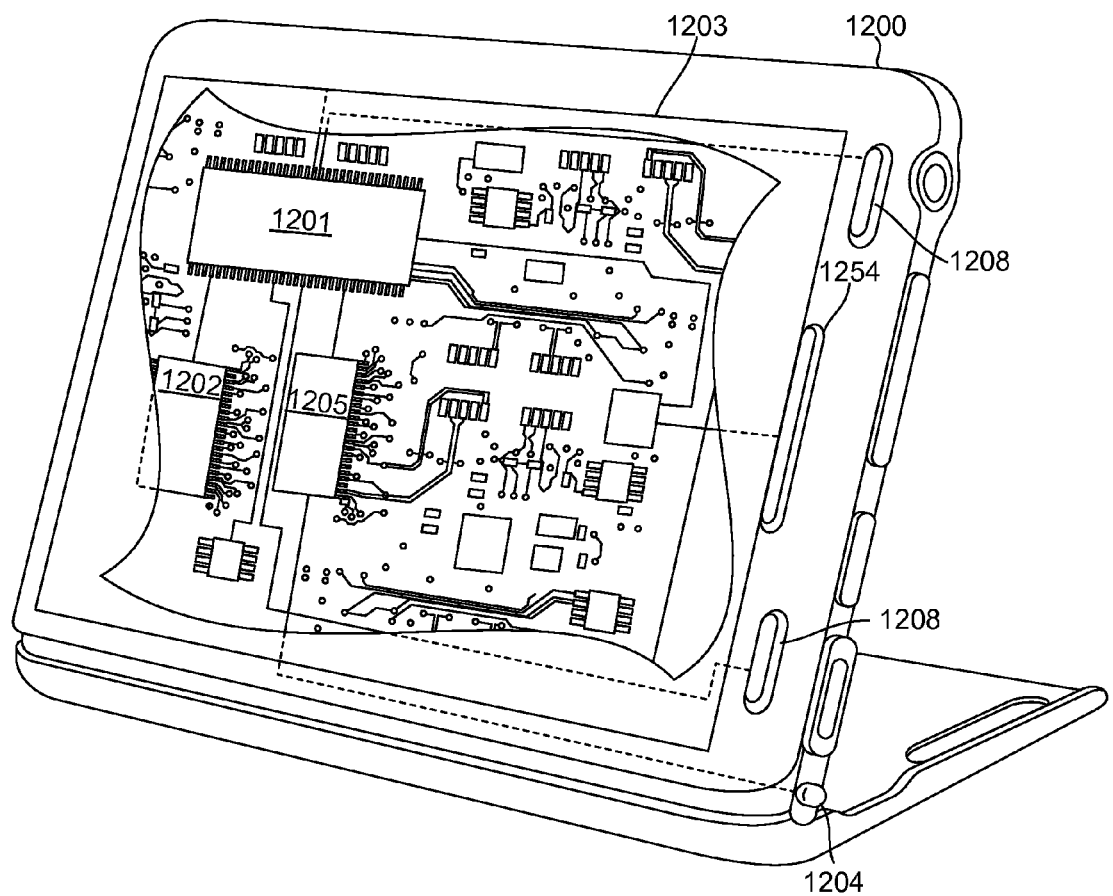
FIG. 12 is a component block diagram of a mobile device suitable for use in an embodiment.

Typical wireless receivers 1200 suitable for use with the various embodiments will have in common the components illustrated in FIG. 12. For example, an exemplary wireless receiver 1200 may include a processor 1201 coupled to internal memory 1202, a display 1203, and to a speaker 1254. Additionally, the wireless receiver 1200 may have an antenna 1204 for sending and receiving electromagnetic radiation that is connected to a wireless data link and/or cellular telephone transceiver 1205 coupled to the processor 1201. The wireless receiver 1200 typically also includes keys 1208 for receiving user inputs.

The processor 1201 may be any programmable microprocessor, microcomputer or multiple processor chip or chips that are configured by software instructions (applications) to perform a variety of functions, including the functions of the various embodiments described herein. In some mobile devices, multiple processors 1201 are provided, such as one processor dedicated to wireless communication functions and one processor dedicated to running other applications. Typically, software applications are stored in the internal memory 1202 before they are accessed and loaded into the processor 1201. In some mobile devices, the processor 1201 may include internal memory sufficient to store the application software instructions. In many wireless receivers 1200, the internal memory 1202 may be a volatile or nonvolatile memory, such as flash memory, or a mixture of both. For the purposes of this description, a general reference to memory refers to all memory accessible by the processor 1201, including internal memory 1202, removable memory plugged into the wireless receiver 1200, and memory within the processor 1201 itself.

The processor 1201 may be any programmable microprocessor, microcomputer or multiple processor chip or chips that can be configured by software instructions (applications) to perform a variety of functions, including the functions of the various embodiments described below. In some mobile receiver devices, multiple processors 1201 may be provided, such as one processor dedicated to wireless communication functions and one processor dedicated to running other applications. Typically, software applications may be stored in the internal memory 1202, 1202, and 1203 before they are accessed and loaded into the processor 1201. The processor 1201 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps are described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of equalizing signals in a receiver device for capturing a block of data generated from N data symbols in a single carrier communication system, the method comprising:
   receiving samples in the receiver device;
   performing a pN point discrete Fourier transform of the samples at a p/T sampler output of a receiver circuit in the receiver device to generate a frequency domain representation of r(kT/p) for each sample;
   generating a channel estimate;
   computing the frequency response of a zero-forcing or minimum-mean-square equalizer;
   multiplying a conjugate of the computed frequency response with the generated frequency domain representation of each sample to generate a product value;
   generating N-aliased frequency domain values from the generated product value for each of the samples in a transition band; and
   performing a transform on the generated N-aliased frequency domain values to generate estimates of a transmitted time domain data symbol.

2. The method of claim 1, further comprising:
   performing a finite Fourier transform on overlapped data segments so as to avoid an edge effect caused when data blocks with cyclic prefix are not used.

3. The method of claim 1, wherein the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty} |G_{ch}(f+m/T)|^2 + \phi_z(f)}.$$

wherein:
   $G_{ch}(f)$ is a channel frequency response;

$$\frac{1}{T}\sum_{m=-\infty}^{\infty} |G_{ch}(f+m/T)|^2 + \phi_z(f)$$

is an aliased power spectrum of the channel frequency response $G_{ch}(f)$;
   T is a period; and
   $\phi_z(f)$ is a power spectrum of noise.

4. The method of claim 1, wherein the frequency response is computed for a zero-forcing equalizer using the formula:

$$G_{eq}(f) = \frac{TG_{ch}^*(f)}{\sum_{m=-\infty}^{\infty} |G_{ch}(f+m/T)|^2}.$$

wherein:
   $G_{ch}(f)$ is a channel frequency response; and
   T is a period.

5. The method of claim 1, further comprising:
   computing a frequency-domain equalization of an 8-level vestigial sideband modulation (8-VSB) signal; and
   performing a conjugate, flip and add operation on frequency components below 0 and above 1/T.

6. The method of claim 5, wherein computing the frequency-domain equalization of the 8-VSB signal comprises computing the frequency-domain equalization of the 8-VSB signal so that the computed 8-VSB signal comprises a positive spectrum portion and a negative spectrum portion.

7. The method of claim 6, wherein computing the frequency-domain equalization of the 8-VSB signal so that the computed 8-VSB signal that comprises the positive spectrum portion and the negative spectrum portion comprises generating the 8-VSB signal to include a spectrum of real baseband data that includes a first adjacent image of the negative spectrum portion and a second adjacent image of the positive spectrum portion.

8. The method of claim 1, further comprising generating the channel estimate in the receiver device at substantially the same time as receiving the samples in the receiver device.

9. The method of claim 1, further comprising generating the channel estimate using time domain samples.

10. The method of claim 1, further comprising determining that matrix estimation operations should not be performed based on the generated estimates of the transmitted time domain data symbol.

11. The method of claim 1, wherein performing the pN point discrete Fourier transform of the samples at a p/T sampler output of the receiver circuit to generate the frequency domain representation of r(kT/p) for each sample comprises performing the pN point discrete Fourier transform of samples so as to generate the frequency domain representation of r(kT/p) yields to yield a symmetric representation.

12. The method of claim 11, wherein the symmetric representation includes at least a negative frequency portion and a positive frequency portion, the method further comprising recovering data from either the negative frequency portion or the positive frequency portion.

13. The method of claim 12, further comprising:
   recovering the positive frequency portion in the receiver device;
   recovering original data by appending the positive frequency portion; and
   performing an inverse operation of composite frequency components to generate the transmitted real data symbols in the receiver device.

14. The method of claim 1, further comprising:
   performing the pN point discrete Fourier transform of samples at a p/T sampler output to generate the frequency domain representation of r(kT/p) for each sample using a first algorithm; and
   performing an N point inverse discrete Fourier transform on the generated N-aliased frequency domain values to generate estimates of the transmitted time domain data symbol using a second algorithm.

15. The method of claim 14, wherein the first algorithm is a different algorithm than the second algorithm.

16. The method of claim 14, wherein performing the pN point discrete Fourier transform of the samples at the p/T sampler output to generate the frequency domain representation of r(kT/p) for each sample using the first algorithm comprises using one of:
 a Cooley-Tukey FFT algorithm;
 a Good-Thomas FFT algorithm;
 a Rader-Brenner FFT algorithm;
 a Bruun's FFT algorithm; and
 a Winograd FFT algorithm.

17. The method of claim 1, further comprising selecting a sample size plus a safety margin to generate the frequency domain representation of r(kT/p) for each sample.

18. The method of claim 17, wherein selecting the sample size comprises selecting a sample size having a predetermined length from two different sample lengths.

19. The method of claim 1, wherein performing the pN point discrete Fourier transform of samples at the p/T sampler output of the receiver circuit to generate a frequency domain representation of r(kT/p) for each sample comprises:
 performing the pN point discrete Fourier transform on an even set of samples; and
 combining the even samples with an odd set of samples.

20. The method of claim 1, wherein performing the pN point discrete Fourier transform of samples at the p/T sampler output of the receiver circuit to generate a frequency domain representation of r(kT/p) for each sample comprises:
 performing the pN point discrete Fourier transform on an odd set of samples; and
 combining the odd samples with an even set of samples.

21. The method of claim 1, further comprising performing phase equalization before performing the transform on the generated N-aliased frequency domain values to generate the estimates of the transmitted time domain data symbol.

22. The method of claim 21, further comprising performing amplitude equalization before performing the transform on the generated N-aliased frequency domain values to generate estimates of the transmitted time domain data symbol.

23. A receiver device, comprising:
 a receiver circuit configured to receive blocks of data generated from N data symbols in a single carrier communication system; and
 a processor coupled to the receiver circuit, wherein the processor is configured with processor-executable instructions to perform operations comprising:
  receiving samples;
  performing a pN point discrete Fourier transform of samples at a p/T sampler output of the receiver circuit to generate a frequency domain representation of r(kT/p) for each sample;
  generating a channel estimate;
  computing the frequency response of a zero-forcing or minimum-mean-square equalizer;
  multiplying a conjugate of the computed frequency response with the generated frequency domain representation of each sample to generate a product value;
  generating N-aliased frequency domain values from the generated product value for each of the samples in a transition band; and
  performing a transform on the generated N-aliased frequency domain values to generate estimates of a transmitted time domain data symbol.

24. The receiver device of claim 23, wherein the processor is configured with processor-executable instructions to perform operations further comprising:
 performing a finite Fourier transform on overlapped data segments so as to avoid an edge effect caused when data blocks with cyclic prefix are not used.

25. The receiver device of claim 23, wherein the processor is configured with processor-executable instructions to perform operations such that the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty} |G_{ch}(f+m/T)|^2 + \phi_z(f)}.$$

wherein:
 $G_{ch}(f)$ is a channel frequency response;

$$\frac{1}{T}\sum_{m=-\infty}^{\infty} |G_{ch}(f+m/T)|^2 + \phi_z(f)$$

is an aliased power spectrum of the channel frequency response $G_{ch}(f)$;
 T is a period; and
 $\phi_z(f)$ is a power spectrum of noise.

26. The receiver device of claim 23, wherein the processor is configured with processor-executable instructions to perform operations such that the frequency response is computed for a zero-forcing equalizer using the formula:

$$G_{eq}(f) = \frac{TG_{ch}^*(f)}{\sum_{m=-\infty}^{\infty} |G_{ch}(f+m/T)|^2}.$$

wherein:
 $G_{ch}(f)$ is a channel frequency response; and
 T is a period.

27. The receiver device of claim 23, wherein the processor is configured with processor-executable instructions to perform operations further comprising:
 computing a frequency-domain equalization of an 8-level vestigial sideband modulation (8-VSB) signal; and
 performing a conjugate, flip and add operation on frequency components below 0 and above 1/T.

28. The receiver device of claim 27, wherein the processor is configured with processor-executable instructions to perform operations such that computing the frequency-domain equalization of the 8-VSB signal comprises computing the frequency-domain equalization of the 8-VSB signal so that the computed 8-VSB signal comprises a positive spectrum portion and a negative spectrum portion.

29. The receiver device of claim 28, wherein the processor is configured with processor-executable instructions to perform operations such that computing the frequency-domain equalization of the 8-VSB signal so that the computed 8-VSB signal comprises the positive spectrum portion and the negative spectrum portion comprises generating the 8-VSB signal to include a spectrum of real baseband data that includes a first adjacent image of the negative spectrum portion and a second adjacent image of the positive spectrum portion.

30. The receiver device of claim 23, wherein the processor is configured with processor-executable instructions to perform operations further comprising performing the channel estimate in the receiver device at substantially the same time as receiving the samples.

31. The receiver device of claim 23, wherein the processor is configured with processor-executable instructions to perform operations further comprising generating the channel estimate using time domain samples.

32. The receiver device of claim 23, wherein the processor is configured with processor-executable instructions to perform operations further comprising determining that matrix estimation operations should not be performed based on the generated estimates of the transmitted time domain data symbol.

33. The receiver device of claim 23, wherein the processor is configured with processor-executable instructions to perform operations such that performing the pN point discrete Fourier transform of the samples at a p/T sampler output of the receiver circuit to generate the frequency domain representation of r(kT/p) for each sample comprises performing the pN point discrete Fourier transform of samples so as to generate the frequency domain representation of r(kT/p) to yield a symmetric representation.

34. The receiver device of claim 33, wherein the processor is configured with processor-executable instructions to perform operations such that the symmetric representation includes at least a negative frequency portion and a positive frequency portion, and
wherein the processor is configured with processor-executable instructions to perform operations further comprising recovering data from either the negative frequency portion or the positive frequency portion.

35. The receiver device of claim 34, wherein the processor is configured with processor-executable instructions to perform operations further comprising:
recovering the positive frequency portion in the receiver device;
recovering original data by appending the positive frequency portion; and
performing an inverse operation of composite frequency components to generate the transmitted real data symbols in the receiver device.

36. The receiver device of claim 23, wherein the processor is configured with processor-executable instructions to perform operations further comprising:
performing the pN point discrete Fourier transform of samples at a p/T sampler output to generate the frequency domain representation of r(kT/p) for each sample using a first algorithm; and
performing an N point inverse discrete Fourier transform on the generated N-aliased frequency domain values to generate estimates of the transmitted time domain data symbol using a second algorithm.

37. The receiver device of claim 36, wherein the processor is configured with processor-executable instructions to perform operations such that the first algorithm is a different algorithm than the second algorithm.

38. The receiver device of claim 36, wherein the processor is configured with processor-executable instructions to perform operations such that performing the pN point discrete Fourier transform of the samples at the p/T sampler output to generate the frequency domain representation of r(kT/p) for each sample using the first algorithm comprises using one of:
a Cooley-Tukey FFT algorithm;
a Good-Thomas FFT algorithm;
a Rader-Brenner FFT algorithm;
a Bruun's FFT algorithm; and
a Winograd FFT algorithm.

39. The receiver device of claim 23, wherein the processor is configured with processor-executable instructions to perform operations further comprising selecting a sample size plus a safety margin to generate the frequency domain representation of r(kT/p) for each sample.

40. The receiver device of claim 39, wherein the processor is configured with processor-executable instructions to perform operations such that selecting the sample size comprises selecting a sample size having a predetermined length from two different sample lengths.

41. The receiver device of claim 23, wherein the processor is configured with processor-executable instructions to perform operations such that performing the pN point discrete Fourier transform of samples at the p/T sampler output of the receiver circuit to generate a frequency domain representation of r(kT/p) for each sample comprises:
performing the pN point discrete Fourier transform on an even set of samples; and
combining the even samples with an odd set of samples.

42. The receiver device of claim 23, wherein the processor is configured with processor-executable instructions to perform operations such that performing the pN point discrete Fourier transform of samples at the p/T sampler output of the receiver circuit to generate a frequency domain representation of r(kT/p) for each sample comprises:
performing the pN point discrete Fourier transform on an odd set of samples; and
combining the odd samples with an even set of samples.

43. The receiver device of claim 23, wherein the processor is configured with processor-executable instructions to perform operations further comprising performing phase equalization before performing the transform on the generated N-aliased frequency domain values to generate estimates of the transmitted time domain data symbol.

44. The receiver device of claim 43, wherein the processor is configured with processor-executable instructions to perform operations further comprising performing amplitude equalization before performing the transform on the generated N-aliased frequency domain values to generate estimates of the transmitted time domain data symbol.

45. A receiver device, comprising:
means for receiving samples;
means for performing a pN point discrete Fourier transform of samples at a p/T sampler output of the receiver circuit to generate a frequency domain representation of r(kT/p) for each sample;
means for means for generating a channel estimate;
means for computing the frequency response of a zero-forcing or minimum-mean-square equalizer;
means for multiplying a conjugate of the computed frequency response with the generated frequency domain representation of each sample to generate a product value;
means for generating N-aliased frequency domain values from the generated product value for each of the samples in a transition band; and
means for performing a transform on the generated N-aliased frequency domain values to generate estimates of a transmitted time domain data symbol.

46. The receiver device of claim 45, further comprising:
means for performing a finite Fourier transform on overlapped data segments so as to avoid an edge effect caused when data blocks with cyclic prefix are not used.

47. The receiver device of claim 45, wherein means for the means for computing the frequency response of a zero-forcing or minimum-mean-square equalizer comprises means for computing the frequency response for a minimum-mean-square equalizer (MMSE) using the formula:

$$G_{eq,MMSE}(f) = \frac{G_{ch}^*(f)}{\frac{1}{T}\sum_{m=-\infty}^{\infty}|G_{ch}(f+m/T)|^2 + \phi_z(f)}.$$

wherein:

$G_{ch}(f)$ is a channel frequency response;

$$\frac{1}{T}\sum_{m=-\infty}^{\infty}|G_{ch}(f+m/T)|^2 + \phi_z(f)$$

is an aliased power spectrum of the channel frequency response $G_{ch}(f)$;

T is a period; and $\phi_z(f)$ is a power spectrum of noise.

48. The receiver device of claim 45, wherein means for the means for computing the frequency response of a zero-forcing or minimum-mean-square equalizer comprises means for computing the frequency response for a zero-forcing equalizer using the formula:

$$G_{eq}(f) = \frac{TG_{ch}^*(f)}{\sum_{m=-\infty}^{\infty}|G_{ch}(f+m/T)|^2}.$$

wherein:

$G_{ch}(f)$ is a channel frequency response; and

T is a period.

49. The receiver device of claim 45, further comprising:
means for computing a frequency-domain equalization of an 8-level vestigial sideband modulation (8-VSB) signal; and
means for performing a conjugate, flip and add operation on frequency components below 0 and above 1/T.

50. The receiver device of claim 49, wherein means for computing the frequency-domain equalization of the 8-VSB signal comprises means for computing the frequency-domain equalization of the 8-VSB signal so that the computed 8-VSB signal comprises a positive spectrum portion and a negative spectrum portion.

51. The receiver device of claim 50, wherein means for computing the frequency-domain equalization of the 8-VSB signal so that the computed 8-VSB signal comprises the positive spectrum portion and the negative spectrum portion comprises means for generating the 8-VSB signal to include a spectrum of real baseband data that includes a second adjacent image of the negative spectrum portion and a second adjacent image of the positive spectrum portion.

52. The receiver device of claim 45, further comprising means for performing the channel estimate in the receiver device at substantially the same time as receiving the samples.

53. The receiver device of claim 45, further comprising means for generating the channel estimate using time domain samples.

54. The receiver device of claim 45, further comprising means for determining that matrix estimation operations should not be performed based on the generated estimates of the transmitted time domain data symbol.

55. The receiver device of claim 45, wherein means for performing the pN point discrete Fourier transform of the samples at a p/T sampler output of the receiver circuit to generate the frequency domain representation of r(kT/p) for each sample comprises performing the pN point discrete Fourier transform of samples so as to generate the frequency domain representation of r(kT/p) to yield a symmetric representation.

56. The receiver device of claim 55, wherein the symmetric representation includes at least a negative frequency portion and a positive frequency portion, and wherein receiver device further comprising means for recovering data from either the negative frequency portion or the positive frequency portion.

57. The receiver device of claim 56, further comprising:
means for recovering the positive frequency portion in the receiver device;
means for recovering original data by appending the positive frequency portion; and
means for performing an inverse operation of composite frequency components to generate the transmitted real data symbols in the receiver device.

58. The receiver device of claim 45, further comprising:
means for performing the pN point discrete Fourier transform of samples at a p/T sampler output to generate the frequency domain representation of r(kT/p) for each sample using a first algorithm; and
means for performing an N point inverse discrete Fourier transform on the generated N-aliased frequency domain values to generate estimates of the transmitted time domain data symbol using a second algorithm.

59. The receiver device of claim 58, wherein the first algorithm is a different algorithm than the second algorithm.

60. The receiver device of claim 58, wherein means for performing the pN point discrete Fourier transform of the samples at the p/T sampler output to generate the frequency domain representation of r(kT/p) for each sample using the first algorithm comprises means for using one of:
a Cooley-Tukey FFT algorithm;
a Good-Thomas FFT algorithm;
a Rader-Brenner FFT algorithm;
a Bruun's FFT algorithm; and
a Winograd FFT algorithm.

61. The receiver device of claim 45, further comprising means for selecting a sample size plus a safety margin to generate the frequency domain representation of r(kT/p) for each sample.

62. The receiver device of claim 61, wherein means for selecting a sample size comprises means for selecting a sample size of a predetermined length from two different sample lengths.

63. The receiver device of claim 45, wherein means for performing the pN point discrete Fourier transform of samples at the p/T sampler output of the receiver circuit to generate a frequency domain representation of r(kT/p) for each sample comprises:
means for performing the pN point discrete Fourier transform on an even set of samples; and
means for combining the even samples with an odd set of samples.

64. The receiver device of claim 45, wherein means for performing the pN point discrete Fourier transform of samples at the p/T sampler output of the receiver circuit to generate a frequency domain representation of r(kT/p) for each sample comprises:
means for performing the pN point discrete Fourier transform on an odd set of samples; and
combining the odd samples with an even set of samples.

65. The receiver device of claim 45, further comprising means for performing phase equalization before performing the transform on the generated N-aliased frequency domain values to generate estimates of the transmitted time domain data symbol.

66. The receiver device of claim 65, further comprising means for performing amplitude equalization before performing the transform on the generated N-aliased frequency domain values to generate the estimates of the transmitted time domain data symbol.

67. A non-transitory processor-readable storage medium having stored thereon processor-executable instructions configured to cause a receiver device processor to perform operations comprising:
  receiving samples;
  performing a pN point discrete Fourier transform of samples at a p/T sampler output of the receiver circuit to generate a frequency domain representation of r(kT/p) for each sample;
  generating a channel estimate;
  computing the frequency response of a zero-forcing or minimum-mean-square equalizer;
  multiplying a conjugate of the computed frequency response with the generated frequency domain representation of each sample to generate a product value;
  generating N-aliased frequency domain values from the generated product value for each of the samples in a transition band; and
  performing a transform on the generated N-aliased frequency domain values to generate estimates of a transmitted time domain data symbol.

68. The non-transitory processor-readable storage medium of claim 67, wherein the stored processor-executable instructions are configured to cause a receiver device processor to perform operations further comprising:
  performing a finite Fourier transform on overlapped data segments so as to avoid an edge effect caused when data blocks with cyclic prefix are not used.

69. The non-transitory processor-readable storage medium of claim 67, wherein the stored processor-executable instructions are configured to cause a receiver device processor to perform operations such that the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty} |G_{ch}(f+m/T)|^2 + \phi_z(f)}.$$

wherein:
  $G_{ch}(f)$ is a channel frequency response;

$$\frac{1}{T}\sum_{m=-\infty}^{\infty} |G_{ch}(f+m/T)|^2 + \phi_z(f)$$

is an aliased power spectrum of the channel frequency response $G_{ch}(f)$;
  T is a period; and
  $\phi_z(f)$ is a power spectrum of noise.

70. The non-transitory processor-readable storage medium of claim 67, wherein the stored processor-executable instructions are configured to cause a receiver device processor to perform operations such that the frequency response is computed for a zero-forcing equalizer using the formula:

$$G_{eq}(f) = \frac{TG_{ch}^*(f)}{\sum_{m=-\infty}^{\infty} |G_{ch}(f+m/T)|^2}.$$

wherein:
  $G_{ch}(f)$ is a channel frequency response; and
  T is a period.

71. The non-transitory processor-readable storage medium of claim 67, wherein the stored processor-executable instructions are configured to cause a receiver device processor to perform operations further comprising:
  computing a frequency-domain equalization of an 8-level vestigial sideband modulation (8-VSB) signal; and
  performing a conjugate, flip and add operation on frequency components below 0 and above 1/T.

72. The non-transitory processor-readable storage medium of claim 71, wherein the stored processor-executable instructions are configured to cause a receiver device processor to perform operations such that computing the frequency-domain equalization of the 8-VSB signal comprises computing the frequency-domain equalization of the 8-VSB signal so that the computed 8-VSB signal comprises a positive spectrum portion and a negative spectrum portion.

73. The non-transitory processor-readable storage medium of claim 72, wherein the stored processor-executable instructions are configured to cause a receiver device processor to perform operations such that computing the frequency-domain equalization of the 8-VSB signal so that the computed 8-VSB signal so that the computed 8-VSB signal comprises the positive spectrum portion and the negative spectrum portion comprises generating the 8-VSB signal to include a spectrum of real baseband data that includes an adjacent image of the negative spectrum portion and an adjacent image of the positive spectrum portion.

74. The non-transitory processor-readable storage medium of claim 67, wherein the stored processor-executable instructions are configured to cause a receiver device processor to perform operations further comprising performing the channel estimate in the receiver device at substantially the same time as receiving the samples.

75. The non-transitory processor-readable storage medium of claim 67, wherein the stored processor-executable instructions are configured to cause a receiver device processor to perform operations further comprising generating the channel estimate using time domain samples.

76. The non-transitory processor-readable storage medium of claim 67, wherein the stored processor-executable instructions are configured to cause a receiver device processor to perform operations further comprising determining that matrix estimation operations should not be performed based on the generated estimates of the transmitted time domain data symbol.

77. The non-transitory processor-readable storage medium of claim 67, wherein the stored processor-executable instructions are configured to cause a receiver device processor to perform operations such that performing the pN point discrete Fourier transform of the samples at a p/T sampler output of the receiver circuit to generate the frequency domain representation of r(kT/p) for each sample comprises performing the pN point discrete Fourier transform of samples so as to generate the frequency domain representation of r(kT/p) to yield a symmetric representation.

78. The non-transitory processor-readable storage medium of claim 67, wherein the stored processor-executable instructions are configured to cause a receiver device processor to perform operations such that frequency domain representation includes at least a negative frequency portion and a positive frequency portion, and
the stored processor-executable instructions are configured to cause a receiver device processor to perform operations further comprising recovering data from either the negative frequency portion or the positive frequency portion.

79. The non-transitory processor-readable storage medium of claim 78, wherein the stored processor-executable instructions are configured to cause a receiver device processor to perform operations further comprising:
recovering the positive frequency portion in the receiver device;
recovering original data by appending the positive frequency portion; and
performing an inverse operation of composite frequency components to generate the transmitted real data symbols in the receiver device.

80. The non-transitory processor-readable storage medium of claim 67, wherein the stored processor-executable instructions are configured to cause a receiver device processor to perform operations further comprising:
performing the pN point discrete Fourier transform of samples at a p/T sampler output to generate the frequency domain representation of r(kT/p) for each sample using a first algorithm; and
performing an N point inverse discrete Fourier transform on the generated N-aliased frequency domain values to generate estimates of the transmitted time domain data symbol using a second algorithm.

81. The non-transitory processor-readable storage medium of claim 80, wherein the stored processor-executable instructions are configured to cause a receiver device processor to perform operations such that the first algorithm is a different algorithm than the second algorithm.

82. The non-transitory processor-readable storage medium of claim 80, wherein the stored processor-executable instructions are configured to cause a receiver device processor to perform operations such that performing the pN point discrete Fourier transform of the samples at the p/T sampler output to generate the frequency domain representation of r(kT/p) for each sample using the first algorithm comprises using one of:
a Cooley-Tukey FFT algorithm;
a Good-Thomas FFT algorithm;
a Rader-Brenner FFT algorithm;
a Bruun's FFT algorithm; and
a Winograd FFT algorithm.

83. The non-transitory processor-readable storage medium of claim 67, wherein the stored processor-executable instructions are configured to cause a receiver device processor to perform operations further comprising selecting a sample size plus a safety margin to generate the frequency domain representation of r(kT/p) for each sample.

84. The non-transitory processor-readable storage medium of claim 83, wherein the stored processor-executable instructions are configured to cause a receiver device processor to perform operations such that selecting the sample size comprises selecting a sample size having a predetermined length from two different sample lengths.

85. The non-transitory processor-readable storage medium of claim 67, wherein the stored processor-executable instructions are configured to cause a receiver device processor to perform operations such that performing the pN point discrete Fourier transform of samples at the p/T sampler output of the receiver circuit to generate a frequency domain representation of r(kT/p) for each sample comprises:
performing the pN point discrete Fourier transform on an even set of samples; and
combining the even samples with an odd set of samples.

86. The non-transitory processor-readable storage medium of claim 67, wherein the stored processor-executable instructions are configured to cause a receiver device processor to perform operations such that performing the pN point discrete Fourier transform of samples at the p/T sampler output of the receiver circuit to generate a frequency domain representation of r(kT/p) for each sample comprises:
performing the pN point discrete Fourier transform on an odd set of samples; and
combining the odd samples with an even set of samples.

87. The non-transitory processor-readable storage medium of claim 67, wherein the stored processor-executable instructions are configured to cause a receiver device processor to perform operations further comprising performing phase equalization before performing the transform on the generated N-aliased frequency domain values to generate the estimates of the transmitted time domain data symbol.

88. The non-transitory processor-readable storage medium of claim 87, wherein the stored processor-executable instructions are configured to cause a receiver device processor to perform operations further comprising performing amplitude equalization before performing the transform on the generated N-aliased frequency domain values to generate estimates of the transmitted time domain data symbol.

89. A method of equalizing a block of data generated from N data symbols in a single carrier communication system, comprising:
receiving a plurality of samples;
applying a first algorithm to the samples to generate a frequency domain representation of the samples;
generating a channel estimate;
computing a frequency response of an equalizer;
multiplying a conjugate of the computed frequency response with the generated frequency domain representation of each sample to generate a product value;
generating N-aliased frequency domain values; and
applying a second algorithm to the generated N-aliased frequency domain values to generate estimates of a transmitted time domain data symbol.

90. The method of claim 89, wherein computing the frequency response of the equalizer comprises substituting the channel estimate with another channel estimate that is obtained from a training sequence.

91. The method of claim 90, further comprising storing the training sequence in an index.

92. The method of claim 89, wherein generating the N-aliased frequency domain values comprises generating the N-aliased frequency domain values from the generated product value for each of the samples in a transition band.

93. The method of claim 92, wherein applying the second algorithm to the generated N-aliased frequency domain values to generate estimates of the transmitted time domain data symbol comprises performing an N point inverse discrete Fourier transform on the generated N-aliased frequency domain values to generate the estimates of the transmitted time domain data symbol.

94. The method of claim 93, wherein applying the first algorithm to the samples to generate the frequency domain representation of the samples comprises performing a pN point discrete Fourier transform of samples at a p/T sampler output to generate the frequency domain representation of r(kT/p) for each sample.

95. The method of claim 93, further comprising:
performing a finite Fourier transform on overlapped data segments so as to avoid an edge effect caused when data blocks with cyclic prefix are not used.

96. The method of claim 92, wherein the second algorithm is an inverse of the first algorithm.

97. The method of claim 92, wherein the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty}|G_{ch}(f+m/T)|^2 + \phi_z(f)}.$$

wherein:
$G_{ch}(f)$ is a channel frequency response;

$$\frac{1}{T}\sum_{m=-\infty}^{\infty}|G_{ch}(f+m/T)|^2 + \phi_z(f)$$

is an aliased power spectrum of the channel frequency response $G_{ch}(f)$;
T is a period; and
$\phi_z(f)$ is a power spectrum of noise.

98. The method of claim 92, wherein the frequency response is computed for a zero-forcing equalizer using the formula:

$$G_{eq}(f) = \frac{TG_{ch}^*(f)}{\sum_{m=-\infty}^{\infty}|G_{ch}(f+m/T)|^2}.$$

wherein:
$G_{ch}(f)$ is a channel frequency response; and
T is a period.

99. The method of claim 92, wherein applying the first algorithm to the samples to generate the frequency domain representation of the samples comprises:
performing the first algorithm on an even set of samples; and
combining the even samples with an odd set of samples.

100. The method of claim 92, wherein applying the first algorithm to the samples to generate the frequency domain representation of the samples comprises:
performing the first algorithm on an odd set of samples; and
combining the odd samples with an even set of samples.

101. A receiver device, comprising:
a receiver circuit configured to receive blocks of data generated from N data symbols in a single carrier communication system; and
a processor coupled to the receiver circuit, wherein the processor is configured with processor-executable instructions to perform operations comprising:
receiving a plurality of samples;
applying a first algorithm to the samples to generate a frequency domain representation of the samples;
generating a channel estimate;
computing a frequency response of an equalizer;
multiplying a conjugate of the computed frequency response with the generated frequency domain representation of each sample to generate a product value;
generating N-aliased frequency domain values from the generated product value for each of the samples in a transition band; and
applying a second algorithm to the generated N-aliased frequency domain values to generate estimates of a transmitted time domain data symbol.

102. The receiver device of claim 101, wherein the processor is configured with processor-executable instructions to perform operations such that applying the second algorithm to the generated N-aliased frequency domain values to generate estimates of the transmitted time domain data symbol comprises performing an N point inverse discrete Fourier transform on the generated N-aliased frequency domain values to generate estimates of the transmitted time domain data symbol.

103. The receiver device of claim 102, wherein the processor is configured with processor-executable instructions to perform operations such that applying the first algorithm to the samples to generate the frequency domain representation of the samples comprises performing a pN point discrete Fourier transform of samples at a p/T sampler output to generate the frequency domain representation of r(kT/p) for each sample.

104. The receiver device of claim 101, wherein the processor is configured with processor-executable instructions to perform operations such that applying the second algorithm to the generated N-aliased frequency domain values to generate estimates of the transmitted time domain data symbol comprises applying an inverse of the first algorithm.

105. The receiver device of claim 102, wherein the processor is configured with processor-executable instructions to perform operations further comprising:
performing a finite Fourier transform on overlapped data segments so as to avoid an edge effect caused when data blocks with cyclic prefix are not used.

106. The receiver device of claim 101, wherein the processor is configured with processor-executable instructions to perform operations such that the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty}|G_{ch}(f+m/T)|^2 + \phi_z(f)}.$$

wherein:
$G_{ch}(f)$ is a channel frequency response;

$$\frac{1}{T}\sum_{m=-\infty}^{\infty}|G_{ch}(f+m/T)|^2 + \phi_z(f)$$

is an aliased power spectrum of the channel frequency response $G_{ch}(f)$;
T is a period; and
$\phi_z(f)$ is a power spectrum of noise.

107. The receiver device of claim 101, wherein the processor is configured with processor-executable instructions to perform operations such that the frequency response is computed for a zero-forcing equalizer using the formula:

$$G_{eq}(f) = \frac{TG_{ch}^*(f)}{\sum_{m=-\infty}^{\infty} |G_{ch}(f+m/T)|^2}.$$

wherein:
$G_{ch}(f)$ is a channel frequency response; and
T is a period.

108. The receiver device of claim 101, wherein the processor is configured with processor-executable instructions to perform operations such that applying the first algorithm to the samples to generate the frequency domain representation of the samples comprises:
performing the first algorithm on an even set of samples; and
combining the even samples with an odd set of samples.

109. The receiver device of claim 101, wherein the processor is configured with processor-executable instructions to perform operations such that applying the first algorithm to the samples to generate the frequency domain representation of the samples comprises:
performing the first algorithm on an odd set of samples; and
combining the odd samples with an even set of samples.

110. A receiver device, comprising:
means for receiving a plurality of samples;
means for applying a first algorithm to the samples to generate a frequency domain representation of the samples;
means for generating a channel estimate;
means for computing a frequency response of an equalizer;
means for multiplying a conjugate of the computed frequency response with the generated frequency domain representation of each sample to generate a product value;
means for generating N-aliased frequency domain values from the generated product value for each of the samples in a transition band; and
means for applying a second algorithm to the generated N-aliased frequency domain values to generate estimates of a transmitted time domain data symbol.

111. The receiver device of claim 110, wherein means for applying the second algorithm to the generated N-aliased frequency domain values to generate estimates of the transmitted time domain data symbol comprises means for performing an N point inverse discrete Fourier transform on the generated N-aliased frequency domain values to generate estimates of the transmitted time domain data symbol.

112. The receiver device of claim 111, wherein means for applying the first algorithm to the samples to generate the frequency domain representation of the samples comprises means for performing a pN point discrete Fourier transform of samples at a p/T sampler output to generate the frequency domain representation of r(kT/p) for each sample.

113. The receiver device of claim 110, wherein applying the second algorithm to the generated N-aliased frequency domain values to generate estimates of the transmitted time domain data symbol comprises applying an inverse of the first algorithm.

114. The receiver device of claim 111, further comprising means for performing finite Fourier transform on overlapped data segments so as to avoid an edge effect caused when data blocks with cyclic prefix are not used.

115. The receiver device of claim 110, wherein means for computing the frequency response of an equalizer comprises means for computing the frequency response of a minimum-mean-square equalizer (MMSE) using the formula:

$$G_{eq,MMSE}(f) = \frac{G_{ch}^*(f)}{\frac{1}{T}\sum_{m=-\infty}^{\infty} |G_{ch}(f+m/T)|^2 + \phi_z(f)}.$$

wherein:
$G_{ch}(f)$ is a channel frequency response;

$$\frac{1}{T}\sum_{m=-\infty}^{\infty} |G_{ch}(f+m/T)|^2 + \phi_z(f)$$

is an aliased power spectrum of the channel frequency response $G_{ch}(f)$;
T is a period; and
$\phi_z(f)$ is a power spectrum of noise.

116. The receiver device of claim 110, wherein means for computing the frequency response of an equalizer comprises means for computing the frequency response for a zero-forcing equalizer using the formula:

$$G_{eq}(f) = \frac{TG_{ch}^*(f)}{\sum_{m=-\infty}^{\infty} |G_{ch}(f+m/T)|^2}.$$

wherein:
$G_{ch}(f)$ is a channel frequency response; and
T is a period.

117. The receiver device of claim 110, wherein means for applying the first algorithm to the samples to generate the frequency domain representation of the samples comprises:
means for performing the first algorithm on an even set of samples; and
means for combining the even samples with an odd set of samples.

118. The receiver device of claim 110, wherein means for applying the first algorithm to the samples to generate the frequency domain representation of the samples comprises:
means for performing the first algorithm on an odd set of samples; and
means for combining the odd samples with an even set of samples.

119. A non-transitory processor-readable storage medium having stored thereon processor-executable instructions configured to cause a receiver device processor to perform operations comprising:
receiving a plurality of samples;
applying a first algorithm to the samples to generate a frequency domain representation of the samples;
generating a channel estimate;
computing a frequency response of an equalizer;
multiplying a conjugate of the computed frequency response with the generated frequency domain representation of each sample to generate a product value;
generating N-aliased frequency domain values from the generated product value for each of the samples in a transition band; and
applying a second algorithm to the generated N-aliased frequency domain values to generate estimates of a transmitted time domain data symbol.

120. The non-transitory processor-readable storage medium of claim 119, wherein the stored processor-executable instructions are configured to cause a receiver device processor to perform operations such that applying the second algorithm to the generated N-aliased frequency domain values to generate estimates of the transmitted time domain data symbol comprises performing an N point inverse discrete Fourier transform on the generated N-aliased frequency domain values to generate estimates of the transmitted time domain data symbol.

121. The non-transitory processor-readable storage medium of claim 120, wherein the stored processor-executable instructions are configured to cause a receiver device processor to perform operations such that applying the first algorithm to the samples to generate the frequency domain representation of the samples comprises performing a pN point discrete Fourier transform of samples at a p/T sampler output to generate the frequency domain representation of r(kT/p) for each sample.

122. The non-transitory processor-readable storage medium of claim 119, wherein the stored processor-executable instructions are configured to cause a receiver device processor to perform operations such that applying the second algorithm to the generated N-aliased frequency domain values to generate estimates of the transmitted time domain data symbol comprises applying an inverse of the first algorithm.

123. The non-transitory processor-readable storage medium of claim 120, wherein the stored processor-executable instructions are configured to cause a receiver device processor to perform operations further comprising:
performing finite Fourier transform on overlapped data segments so as to avoid an edge effect caused when data blocks with cyclic prefix are not used.

124. The non-transitory processor-readable storage medium of claim 119, wherein the stored processor-executable instructions are configured to cause a receiver device processor to perform operations such that the frequency response is computed for a minimum-mean-square equalizer (MMSE) using the formula:

$$G_{eq,MMSE}(f) = \frac{G_{ch}^*(f)}{\frac{1}{T}\sum_{m=-\infty}^{\infty}|G_{ch}(f+m/T)|^2 + \phi_z(f)}.$$

wherein:
$G_{ch}(f)$ is a channel frequency response;

$$\frac{1}{T}\sum_{m=-\infty}^{\infty}|G_{ch}(f+m/T)|^2 + \phi_z(f)$$

is an aliased power spectrum of the channel frequency response $G_{ch}(f)$;
T is a period; and
$\phi_z(f)$ is a power spectrum of noise.

125. The non-transitory processor-readable storage medium of claim 119, wherein the stored processor-executable instructions are configured to cause a receiver device processor to perform operations such that the frequency response is computed for a zero-forcing equalizer using the formula:

$$G_{eq}(f) = \frac{TG_{ch}^*(f)}{\sum_{m=-\infty}^{\infty}|G_{ch}(f+m/T)|^2}.$$

wherein:
$G_{ch}(f)$ is a channel frequency response; and
T is a period.

126. The non-transitory processor-readable storage medium of claim 119, wherein the stored processor-executable instructions are configured to cause a receiver device processor to perform operations such that applying the first algorithm to the samples to generate the frequency domain representation of the samples comprises:
performing the first algorithm on an even set of samples; and
combining the even samples with an odd set of samples.

127. The non-transitory processor-readable storage medium of claim 119, wherein the stored processor-executable instructions are configured to cause a receiver device processor to perform operations such that applying the first algorithm to the samples to generate the frequency domain representation of the samples comprises:
performing the first algorithm on an odd set of samples; and
combining the odd samples with an even set of samples.

* * * * *